(12) United States Patent
Nozaki et al.

(10) Patent No.: US 7,293,551 B2
(45) Date of Patent: *Nov. 13, 2007

(54) LIQUEFIED GAS-FUEL SUPPLY DEVICE FOR DIESEL ENGINE

(75) Inventors: Shinya Nozaki, Higashi-Matsuyama (JP); Toshifumi Noda, Higashi-Matsuyama (JP); Daijo Ushiyama, Higashi-Matsuyama (JP); Teruaki Ishikawa, Higashi-Matsuyama (JP); Yukihiro Hayasaka, Higashi-Matsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 10/540,053

(22) PCT Filed: Dec. 25, 2003

(86) PCT No.: PCT/JP03/16753

§ 371 (c)(1),
(2), (4) Date: Jun. 22, 2005

(87) PCT Pub. No.: WO2004/059158

PCT Pub. Date: Jul. 15, 2004

(65) Prior Publication Data

US 2006/0054141 A1      Mar. 16, 2006

(30) Foreign Application Priority Data

Dec. 26, 2002  (JP) ............................. 2002-376046
Apr. 3, 2003   (JP) ............................. 2003-100603

(51) Int. Cl.
F02M 37/00    (2006.01)
F02M 37/08    (2006.01)

(52) U.S. Cl. .................................................... 123/514

(58) Field of Classification Search ................ 123/514, 123/198 D, 516, 518, 520, 529, 446
See application file for complete search history.

(56) References Cited

U.S. PATENT DOCUMENTS

| | | | | |
|---|---|---|---|---|
| 5,485,818 A | * | 1/1996 | McCandless | 123/294 |
| 5,623,907 A | * | 4/1997 | Cotton et al. | 123/456 |
| 5,690,078 A | * | 11/1997 | Ofner | 123/529 |
| 6,176,225 B1 | * | 1/2001 | Sams et al. | 123/549 |
| 6,805,105 B2 | * | 10/2004 | Kato et al. | 123/514 |
| 6,955,156 B2 | * | 10/2005 | Noda et al. | 123/364 |
| 2005/0145223 A1 | * | 7/2005 | Nozaki et al. | 123/516 |
| 2005/0235948 A1 | * | 10/2005 | Hayasaka et al. | 123/255 |

* cited by examiner

*Primary Examiner*—Mahmoud Gimie
(74) *Attorney, Agent, or Firm*—Priest & Goldstein, PLLC

(57) ABSTRACT

Since an aspirator 7 is disposed at a position lower than a fuel gallery 11 and an overflow fuel pipe 81, DME fuel remaining in the fuel gallery 11 and the overflow fuel pipe 81 can be more efficiently retrieved to a fuel tank 4 by a combined force of gravity and suction force produced in a suction port 7c of the aspirator 7. Since the vapor-phase pressure delivery pipe opening/closing solenoid valve 74 is disposed at a position higher than the fuel gallery 11, DME fuel in a liquid state remaining in the fuel gallery 11 and the overflow fuel pipe 81 is forcedly delivered under pressure to the suction port 7c of the aspirator 7 by a combined force of gravity and the pressure of a vapor phase 4b in the fuel tank 4. Accordingly, time taken to retrieve the DME fuel in an injection system to the fuel tank after the stop of a diesel engine.

20 Claims, 15 Drawing Sheets

LIQUEFIED GAS-FUEL SUPPLY DEVICE FOR DIESEL ENGINE

TECHNICAL FIELD

The present invention relates to a liquefied gas fuel supply device for a diesel engine which uses, as fuel, liquefied gas such as DME (dimethyl ether) or LP gas to which a cetane number improver is added (hereinafter referred to as "high cetane number LP gas").

BACKGROUND ART

A diesel engine which uses clean-burning fuels such as DME (dimethyl ether) and high cetane number LP gas instead of light oil is now attracting attention as air pollution abatement measures for diesel engines. These fuels are liquefied gas fuels unlike light oil which is a conventional fuel. Namely, liquefied gas fuels have boiling points lower than that of light oil, and have the nature of vaporizing at room temperature, whereas light oil exists as a liquid under atmospheric pressure at room temperature. For this reason, in the case of a diesel engine using liquefied gas fuel, after the stop of the diesel engine, liquefied gas fuel remaining in an injection system which is a fuel supply line section leading to a fuel injection nozzle leaks from a nozzle seat part of the fuel injection nozzle into a cylinder of the diesel engine and vaporizes in the cylinder. As a result, vaporized DME fuel is charged in the cylinder, and when the diesel engine is to be started at the next time, there is a risk that abnormal combustion such as knocking occurs and the diesel engine cannot be normally started and large vibrations and noise occur.

As one example of related arts for solving this problem, there is, for example, an injection system (for example, Japanese Patent No. 3111254) which includes at least one heating device and means for forming connection which permits a flow between at least one pressure guide section of an injection system and a fuel tank, after the stop of a fuel supply device (such as an injection pump). The injection system forms connection between at least one pressure guide section of the injection system and the fuel tank after the stop of the fuel supply device, heats at least a part of the pressure guide section to transfer remaining liquefied gas fuel such as DME to a vapor phase and produce a gas blow, and press the remaining liquefied gas fuel of the pressure guide section to the fuel tank by the gas blow. In addition, there is a diesel engine fuel system (for example, JP-A-11-107871) which detects three pressure parameters, atmospheric pressure, fuel tank internal pressure and fuel return pipe internal pressure, and retrieves remaining liquefied gas fuel to a fuel tank by using the difference between these pressures.

In each of the above-mentioned related arts, as means for retrieving the liquefied gas fuel remaining in the pressure guide section such as a fuel return pipe to the fuel tank after the stop of the fuel supply device, it is necessary to incorporate not only means for switching pipe passages by solenoid valves or the like, but also at least one heating device (Japanese Patent No. 3111254) or a pressure sensor for detecting the fuel return pipe internal pressure (JP-A-11-107871). Accordingly, in a fuel supply system for a diesel engine, there is a risk that means for retrieving remaining fuel after the stop of the fuel supply device becomes expensive and the main cause of increasing the cost of the fuel supply system.

The present applicant has previously proposed a liquefied gas fuel supply device including means for retrieving remaining liquefied gas fuel to a fuel tank by aspiration means using an aspirator, as means for retrieving liquefied gas fuel remaining in an injection system to the fuel tank after the stop of the fuel supply device (Application Number 2002-60829). This means for retrieving remaining fuel through the aspirator forms a ring-shaped flow of liquefied gas fuel including the aspirator by using as a driving source a feed pump for delivering liquefied gas fuel from the fuel tank in its original use, and sucks the liquefied gas fuel remaining in the injection system by suction force produced in the aspirator by the flow of the liquefied gas fuel, thereby retrieving the remaining liquefied gas fuel to the fuel tank. Namely, the liquefied gas fuel remaining in the injection system can be retrieved only by the means for forming the ring-shaped flow passage of liquefied gas fuel by the aspirator and the feed pump, whereby the liquefied gas fuel remaining in the injection system after the stop of the fuel supply device without the need to provide a heating device, a pressure sensor or the like. Accordingly, it is possible to construct the remaining-fuel retrieving means at low cost.

However, the present inventor has promoted further intensive research and discovered that if the liquefied gas fuel remaining in the injection system of the liquefied gas fuel supply device after the stop of the diesel engine is to be sucked into the fuel tank by the suction means using the aspirator, a comparatively long time is required to suck all the liquefied gas fuel remaining in the injection system. This is because the suction force by the aspirator having no driving source is weak compared to pumps or the like having driving sources. As a result, a certain extent of time is required to retrieve all the liquefied gas fuel remaining in the injection system of the liquefied gas fuel supply device, and if the diesel engine is again started after the diesel engine is stopped for a short time, the diesel engine is restarted in spite of the fact that all the liquefied gas fuel remaining in the injection system of the liquefied gas fuel supply device is not yet retrieved, so that there is a risk that abnormal combustion such as knocking occurs.

In addition, when the diesel engine is again started after the diesel engine has been stopped, liquefied gas fuel needs to be charged into the injection system of the liquefied gas fuel supply device before the diesel engine is started. Therefore, the diesel engine cannot be started while liquefied gas fuel is being charged into the injection system of the liquefied gas fuel supply device. In addition, since a long time is required to charge liquefied gas fuel into the injection system of the liquefied gas fuel supply device, there is the problem that the diesel engine cannot be rapidly started when the diesel engine and the liquefied gas fuel supply device are stopped.

DISCLOSURE OF THE INVENTION

The invention has been made in view of the above-mentioned problems, and an object of the invention is to reduce time taken to retrieve liquefied gas fuel in an injection system to a fuel tank after the stop of a diesel engine in a liquefied gas fuel supply device for a diesel engine.

Another object of the invention is to reduce time taken to charge liquefied gas fuel into an injection system from a fuel tank at the starting time of a diesel engine in a liquefied gas fuel supply device for a diesel engine.

To achieve the above objects, a first aspect of the invention provides a liquefied gas fuel supply device for a diesel engine characterized by comprising: a fuel tank for reserving liquefied gas fuel; an injection pump for delivering liquefied gas fuel to a fuel injection nozzle of a diesel engine; fuel supply means for delivering the liquefied gas fuel from the fuel tank to the injection pump; and remaining fuel retrieving means for retrieving liquefied gas fuel remaining in the injection pump to the fuel tank, after the stop of the diesel engine. The remaining fuel retrieving means is constructed to cause forced circulation of the liquefied gas fuel in the fuel tank back so as to again return the liquefied gas fuel to the fuel tank through an aspirator, and retrieve the liquefied gas fuel remaining in the injection pump to the fuel tank by suction force produced in a suction port of the aspirator by the forced circulation, and the suction port of the aspirator is disposed at a position lower than an area in the injection pump in which the liquefied gas fuel remains.

According to the invention, the suction port of the aspirator is disposed at a position lower than the area in the injection pump in which the liquefied gas fuel remains. Namely, an area in each of the fuel gallery and the overflow fuel pipe in which the liquefied gas fuel remains after the stop of the liquefied gas fuel supply device is disposed at a position higher than the suction port of the aspirator. Accordingly, the liquefied gas fuel remaining in the area is retrieved to the fuel tank by a combined force of gravity and the suction force produced by the circulation of the liquefied gas fuel, whereby it is possible to more efficiently retrieve liquefied gas fuel remaining in an injection system, by using gravity. Accordingly, it is possible to achieve the effect and advantage of reducing time taken to retrieve the liquefied gas fuel in the injection system to the fuel tank after the stop of the diesel engine.

A second aspect of the invention provides a liquefied gas fuel supply device for a diesel engine characterized by comprising: a feed pump for pressurizing liquefied gas fuel in a fuel tank to a predetermined pressure and delivering the liquefied gas fuel to a feed pipe; an injection pump for delivering the liquefied gas fuel in a fuel gallery into which the liquefied gas fuel delivered via the feed pipe flows, to an injection nozzle of a diesel engine by a predetermined amount at predetermined timing; an overflow fuel pipe for returning to the fuel tank the liquefied gas fuel which overflows from the injection pump; and remaining fuel retrieving means for retrieving to the fuel tank the liquefied gas fuel remaining in the fuel gallery and the overflow fuel pipe, after the stop of the diesel engine. The remaining fuel retrieving means has: a fuel circulation pipe branched from the feed pipe at an intermediate point thereof and connected to the fuel tank; feed pipe opening/closing means provided in the feed pipe on a side downstream of the feed pump in a flowing direction of the liquefied gas fuel, and operative to open and close a flow passage of the feed pipe; and an aspirator provided in the fuel circulation pipe and having a suction port disposed to communicate with the fuel gallery and/or the overflow fuel pipe. The remaining fuel retrieving means is constructed to circulate the liquefied gas fuel delivered from the feed pump, to the fuel tank via the feed pipe, the fuel circulation pipe and the aspirator in the state of cutting off supply to the injection pump by closing the feed pipe opening/closing means, and suck and retrieve the liquefied gas fuel remaining in the fuel gallery and the overflow fuel pipe, to the fuel tank by suction force produced in the suction port of the aspirator on the basis of the circulation. The suction port of the aspirator is disposed at a position lower than the fuel gallery and the overflow fuel pipe.

In this manner, the suction port of the aspirator in which the suction force is produced by the circulation of the liquefied gas fuel is disposed at a position lower than the fuel gallery and the overflow fuel pipe. Namely, the fuel gallery and the overflow fuel pipe in which the liquefied gas fuel remains after the stop of the liquefied gas fuel supply device are disposed at a position higher than the suction port of the aspirator. Accordingly, the liquefied gas fuel remaining in the fuel gallery and the overflow fuel pipe is retrieved to the fuel tank by a combined force of gravity and the suction force produced by the circulation of the liquefied gas fuel, whereby it is possible to more efficiently retrieve the liquefied gas fuel remaining in the injection system, by using gravity. Accordingly, it is possible to achieve the effect and advantage of reducing time taken to retrieve the DME fuel in the injection system to the fuel tank after the stop of the diesel engine.

A third aspect of the invention is characterized by further comprising in the second aspect a check valve disposed between a position where the fuel circulation pipe is branched from the feed pipe and the feed pipe opening/closing means, and operative to prevent liquefied gas fuel from flowing back from the injection pump, and fuel circulation pipe opening/closing means provided in the fuel circulation pipe and operative to open and close a flow passage of the fuel circulation pipe.

A fourth aspect of the invention provides a liquefied gas fuel supply device for a diesel engine characterized by comprising: a feed pump for pressurizing liquefied gas fuel in a fuel tank to a predetermined pressure and delivering the liquefied gas fuel to a feed pipe; an injection pump for delivering the liquefied gas fuel in a fuel gallery into which the liquefied gas fuel delivered via the feed pipe flows, to an injection nozzle of a diesel engine by a predetermined amount at predetermined timing; an overflow fuel pipe for returning to the fuel tank the liquefied gas fuel which overflows from the injection pump; and remaining fuel retrieving means for retrieving to the fuel tank the liquefied gas fuel remaining in the fuel gallery and the overflow fuel pipe, after the stop of the diesel engine. The remaining fuel retrieving means has: a fuel circulation pipe branched from the feed pipe at an intermediate point thereof and connected to the fuel tank; feed pipe opening/closing means provided in the feed pipe on a side downstream of the feed pump in a flowing direction of the liquefied gas fuel, and operative to open and close a flow passage of the feed pipe; and an aspirator provided in the fuel circulation pipe and having a suction port disposed to communicate with the fuel gallery and/or the overflow fuel pipe. The remaining fuel retrieving means is constructed to circulate the liquefied gas fuel delivered from the feed pump, to the fuel tank via the feed pipe, the fuel circulation pipe and the aspirator in the state of cutting off supply to the injection pump by closing the feed pipe opening/closing means, and suck and retrieve the liquefied gas fuel remaining in the fuel gallery and the overflow fuel pipe, to the fuel tank by suction force produced in the suction port of the aspirator on the basis of the circulation. The remaining fuel retrieving means further includes: fuel circulation pipe opening/closing means provided in the fuel circulation pipe and operative to open and close a flow passage of the fuel circulation pipe; and a check valve disposed between a branch point between the feed pipe and the fuel circulation pipe and the feed pipe opening/closing means, and operative to prevent liquefied gas fuel from flowing back from the injection pump.

The fuel circulation pipe is branched from the feed pipe in the vicinity of a delivery port of the feed pump, and is connected to the fuel tank via the inlet and the outlet of the aspirator. When the feed pipe opening/closing means is closed to cut off the communication of the feed pipe on the same side as the injection pump with respect to the branch point between the feed pipe and the fuel circulation pipe and the fuel circulation pipe opening/closing means is opened and the feed pump is activated with the fuel circulation pipe permitted to communicate, a ring-shaped flow of liquefied gas fuel including the aspirator is formed, and the suction force is produced in the suction port of the aspirator. During this state, when the suction port of the aspirator, the fuel gallery and the overflow fuel pipe are communicated with one another, the liquefied gas fuel remaining in the fuel gallery and the overflow fuel pipe can be sucked from the suction port of the aspirator. The liquefied gas fuel sucked from the suction port of the aspirator is retrieved to the fuel tank together with the liquefied gas fuel flowing from the inlet to the outlet of the aspirator.

In addition, since the fuel circulation pipe which constitutes a circulation passage is branched from the feed pipe in the vicinity of the delivery port of the feed pump and is connected to the fuel tank from the inlet to the outlet of the aspirator, the circulation passage of the liquefied gas fuel can be compactly constructed. Namely, since the length of the circulation passage of liquefied gas fuel including the aspirator can be made short, and the flow passage resistance of the circulation passage can be made small. Accordingly, a decrease due to the flow passage resistance in the flow rate of liquefied gas fuel flowing in the circulation passage can be reduced, and a decrease in the suction force produced in the suction port of the aspirator can be reduced, whereby it is possible to improve the efficiency of retrieving of remaining fuel by the aspirator.

In addition, since a check valve for preventing liquefied gas fuel from flowing back from the injection pump is disposed between the branch point where the fuel circulation pipe is branched from the feed pipe and the feed pipe opening/closing means, the feed pipe between the same remains charged with liquefied gas fuel. The liquefied gas fuel charged between the feed pipe opening/closing means and the check valve does not flow into the injection pump, as long as the feed pipe opening/closing means on the side of the injection pump is closed. Accordingly, the above-mentioned abnormal combustion such as knocking is prevented from occurring, owing to the liquefied gas fuel charged between the feed pipe opening/closing means and the check valve, whereby it is not necessary to retrieve the liquefied gas fuel remaining charged between the feed pipe opening/closing means and check vale by the remaining fuel retrieving means.

Then, after the liquefied gas fuel remaining in the fuel gallery and the overflow fuel pipe has been retrieved by means of the aspirator by appropriately opening and closing the fuel circulation pipe opening/closing means and the feed pipe opening/closing means, the fuel circulation pipe opening/closing means is closed with the feed pipe opening/closing means remaining closed, and the feed pipe is stopped and the liquefied gas fuel supply device is stopped. Accordingly, the liquefied gas fuel can be held in the state of being charged between the feed pipe opening/closing means and the check valve. Accordingly, it is possible to reduce the amount of liquefied gas fuel to be retrieved by the remaining fuel retrieving means after the stop of the diesel engine. Furthermore, after the stop of the diesel engine, the liquefied gas fuel is held in the state of being charged between the feed pipe opening/closing means of the feed pipe and the check valve, whereby it is possible to reduce the amount of liquefied gas fuel to be charged into the injection system at the next time when the diesel engine is to be started.

According to the liquefied gas fuel supply device for a diesel engine according to the fourth aspect of the invention, it is possible to improve the efficiency of retrieving of remaining fuel by the aspirator, and it is also possible to reduce the amount of liquefied gas fuel to be retrieved by the remaining fuel retrieving means after the stop of the diesel engine. Accordingly, it is possible to achieve the effect and advantage of reducing time taken to retrieve the liquefied gas fuel in the injection system to the fuel tank after the stop of the diesel engine.

In addition, since it is possible to reduce the amount of liquefied gas fuel to be charged into the injection system at the starting time of the diesel engine, it is possible to achieve the effect and advantage of reducing time taken to charge liquefied gas fuel into the injection system from the fuel tank at the starting time of the diesel engine.

In addition, the suction port of the aspirator in which the suction force is produced by the circulation of liquefied gas fuel is disposed at a position lower than an area in the fuel gallery, the overflow fuel pipe liquefied gas fuel or the like in which area the liquefied gas fuel remains. Namely, each of the fuel gallery and the overflow fuel pipe in which the liquefied gas fuel remains after the stop of the liquefied gas fuel supply device is disposed at a position higher than the suction port of the aspirator. Accordingly, the liquefied gas fuel remaining in the fuel gallery and the overflow fuel pipe is retrieved to the fuel tank by a combined force of gravity and the suction force produced by the circulation of the liquefied gas fuel, whereby it is possible to more efficiently retrieve the liquefied gas fuel remaining in the injection system, by using gravity. Accordingly, it is possible to achieve the effect and advantage of reducing time taken to retrieve the liquefied gas fuel in the injection system to the fuel tank after the stop of the diesel engine.

A fifth aspect of the invention provides a liquefied gas fuel supply device for a diesel engine according to any one of the first to fourth aspects is characterized by further comprising a vapor-phase pressure delivery pipe connecting an inlet for liquefied gas fuel in the injection pump and a vapor phase in the fuel tank, and vapor-phase pressure delivery pipe opening/closing means for opening and closing the vapor-phase pressure delivery pipe.

The vapor phase in the fuel tank and the inlet of the fuel gallery are communicated with each other by the vapor-phase pressure delivery pipe by opening the vapor-phase pressure delivery pipe opening/closing means after the stop of the diesel engine, whereby the pressure of the vapor phase in the fuel tank acts on the fuel gallery. In the vapor phase in the fuel tank, vaporized liquefied gas fuel exists under higher pressure than the pressure in the fuel gallery, whereby the liquefied gas fuel in a liquid state remaining in the fuel gallery and the overflow fuel pipe can be forcedly delivered under pressure to the remaining fuel retrieving means by the pressure of the vapor phase in the fuel tank. Accordingly, it is possible to achieve the effect and advantage of reducing time taken to retrieve the liquefied gas fuel remaining in the fuel gallery and the overflow fuel pipe by the remaining fuel retrieving means.

A sixth aspect of the invention provides a liquefied gas fuel supply device for a diesel engine according to the fifth aspect, characterized in that the vapor-phase pressure delivery pipe opening/closing means is disposed at a position higher than an area in the injection pump in which the liquefied gas fuel remains.

In this manner, since the vapor-phase pressure delivery pipe opening/closing means is disposed at a position higher than the fuel gallery, the liquefied gas fuel in a liquid state remaining in the fuel gallery and the overflow fuel pipe is forcedly delivered under pressure to the remaining fuel retrieving means by a combined force of gravity and the pressure of the vapor phase in the fuel tank. Accordingly, gravity can be used to more efficiently deliver under pressure the liquefied gas fuel in a liquid state remaining in the fuel gallery and the overflow fuel pipe to the remaining fuel retrieving means, whereby it is possible to further reduce time taken to retrieve the liquefied gas fuel remaining in the fuel gallery and the overflow fuel pipe to the fuel tank by the remaining fuel retrieving means.

A seventh aspect of the invention provides a liquefied gas fuel supply device for a diesel engine according to any one of the first to fourth aspects, characterized by including a construction in which the liquefied gas fuel delivered from the injection pump is supplied to a common rail and is delivered to each fuel injection nozzle from the common rail, and further comprising a vapor-phase pressure delivery pipe connecting the common rail and a vapor phase in the fuel tank, and vapor-phase pressure delivery pipe opening/closing means for opening and closing the vapor-phase pressure delivery pipe.

In a common rail diesel engine, the liquefied gas fuel remaining in the common rail also needs to be retrieved to the fuel tank when the diesel engine is to be stopped. In this manner, the vapor phase in the fuel tank and the common rail are disposed to communicate with each other by the vapor-phase pressure delivery pipe, and when the vapor-phase pressure delivery pipe opening/closing means is opened after the stop of the diesel engine, the vapor phase in the fuel tank and the common rail communicate with each other through the vapor-phase pressure delivery pipe, whereby the pressure of the vapor phase in the fuel tank acts on the inside of the common rail. In the vapor phase in the fuel tank, vaporized liquefied gas fuel exists under higher pressure than the pressure in the fuel gallery, whereby the liquefied gas fuel in a liquid state remaining in the common rail can be forcedly delivered under pressure to the remaining fuel retrieving means by the pressure of the vapor phase in the fuel tank. Accordingly, it is possible to achieve the effect and advantage of further reducing time taken to retrieve the liquefied gas fuel remaining in the common rail to the fuel tank by the remaining fuel retrieving means.

An eighth aspect of the invention provides a liquefied gas fuel supply device for a diesel engine according to the seventh aspect, characterized in that the vapor-phase delivery pipe opening/closing means is disposed at a position higher than the common rail.

In this manner, the vapor-phase pressure delivery pipe opening/closing means is disposed at a position higher than the common rail, the liquefied gas fuel in a liquid state remaining in the common rail is forcedly delivered under pressure to the remaining fuel retrieving means by a combined force of gravity and the pressure of the vapor phase in the fuel tank. Accordingly, since the liquefied gas fuel in a liquid state remaining in the common rail can be more efficiently delivered under pressure to the remaining fuel retrieving means by using gravity, it is possible to achieve the effect and advantage of further reducing time taken to retrieve the liquefied gas fuel remaining in the common rail to the fuel tank by the remaining fuel retrieving means.

A ninth aspect of the invention provides a liquefied gas fuel supply device for a diesel engine according to any one of the first and fourth aspects, characterized by including a construction in which the liquefied gas fuel delivered from the injection pump is supplied to a common rail and is delivered to each fuel injection nozzle from the common rail, and further comprising a vapor-phase pressure delivery pipe connecting an inlet of the fuel injection nozzle and a vapor phase in the fuel tank, and vapor-phase pressure delivery pipe opening/closing means for opening and closing the vapor-phase pressure delivery pipe.

In this manner, each fuel injection nozzle and the vapor phase in the fuel tank are disposed to communicate with each other by the vapor-phase pressure delivery pipe, and when the vapor-phase pressure delivery pipe opening/closing means is opened after the stop of the diesel engine, the vapor phase in the fuel tank and each fuel injection nozzle communicate with each other through the vapor-phase pressure delivery pipe, whereby the pressure of the vapor phase in the fuel tank acts on the inside of each fuel injection nozzle. In the vapor phase in the fuel tank, vaporized liquefied gas fuel exists under higher pressure than the pressure in the fuel gallery, whereby the liquefied gas fuel in a liquid state remaining in each fuel injection nozzle can be forcedly delivered under pressure to the remaining fuel retrieving means by the pressure of the vapor phase in the fuel tank. In a general common rail type of fuel supply device, a fuel injection nozzle is disposed at the highest position, a common rail and an injection pump at the second highest position, and a fuel tank at the lowest position. Namely, the liquefied gas fuel remaining in each of the fuel injection nozzle, the common rail and the injection pump (the fuel gallery) can be forcedly delivered under pressure to the remaining fuel retrieving means in order from the highest position by vapor-phase pressure and gravity. Accordingly, it is possible to achieve the effect and advantage of further reducing time taken to retrieve the liquefied gas fuel remaining in the fuel injection nozzle to the fuel tank by the remaining fuel retrieving means.

A tenth aspect of the invention provides a liquefied gas fuel supply device for a diesel engine according to the ninth aspect, characterized in that the vapor-phase pressure delivery pipe opening/closing means is disposed at a position higher than the fuel injection nozzle.

Since the vapor-phase pressure delivery pipe opening/closing means is disposed at a position higher than each fuel injection nozzle in this manner, the liquefied gas fuel remaining in each fuel injection nozzle is forcedly delivered under pressure to the remaining fuel retrieving means by a combined force of gravity and the pressure of the vapor phase in the fuel tank. Accordingly, since the liquefied gas fuel in a liquid state remaining in each fuel injection nozzle can be more efficiently delivered under pressure to the remaining fuel retrieving means by using gravity, it is possible to achieve the effect and advantage of further reducing time taken to retrieve to the fuel tank the liquefied gas fuel remaining in the common rail, by the remaining fuel retrieving means.

The vapor-phase pressure delivery pipe preferably has a throttling section where the inside diameter of the vapor-phase pressure delivery pipe is partially reduced.

The vaporized liquefied gas fuel delivered from the vapor phase in the fuel tank is compressed to a far higher pressure by the throttling section, whereby the remaining liquefied gas fuel in a liquid state can be delivered under a far higher pressure to the remaining fuel retrieving means. Accordingly, it is possible to achieve the effect and advantage of further reducing time taken to retrieve the remaining liquefied gas fuel to the fuel tank.

An eleventh aspect of the invention provides a liquefied gas fuel supply device for a diesel engine according to the second or fourth aspect, characterized by further comprising: an oil separator for separating the liquefied gas fuel mixing with a lubricating oil in a cam chamber of the injection pump which is a dedicated lubricating system separated from a lubricating system for a diesel engine; a compressor for pressurizing the liquefied gas fuel separated by the oil separator and delivering the liquefied gas fuel to the fuel tank; a low-pressure tank connected to a suction port of the compressor; a purge pipe causing the low-pressure tank and the overflow fuel pipe to communicate with each other; and purge pipe opening/closing means capable of opening and closing the purge pipe.

As described previously, the liquefied gas fuel has a nature different from gases at room temperature and is low in viscosity, so that in the injection pump, the liquefied gas fuel leaks into the cam chamber from a plunger of an injection pump element. For this reason, the camber chamber of the injection pump is formed as a dedicated lubricating system separated from the lubricating system of the diesel engine, and the liquefied gas fuel leaking into the cam chamber and mixing with the lubricating oil is separated by the oil separator and delivered under pressure to the fuel tank by the compressor. Accordingly, the liquefied gas fuel leaking into the cam chamber can be decreased.

Since the low-pressure tank is connected to the suction port of this compressor, the inside of the low-pressure tank is maintained in a low-pressure state by the suction force of the compressor. When the purge pipe opening/closing means is controlled to be opened and cause the injection system to communicate with the low-pressure tank, part of the liquefied gas fuel remaining in the injection system can be sucked and retrieved into the low-pressure tank via the overflow fuel pipe by the negative pressure in the low-pressure tank maintained at a low pressure by the suction port of the compressor. Then, the liquefied gas fuel retrieved into the low-pressure tank is delivered to the fuel tank while being vaporized by being sucked by the compressor.

Part of the liquefied gas fuel remaining in the injection system can be sucked and retrieved into the low-pressure tank via the overflow fuel pipe by the negative pressure in the low-pressure tank maintained at a low pressure by using the compressor which delivers to the fuel tank the liquefied gas fuel separated from the lubricating oil in the cam chamber by the oil separator. Accordingly, part of the liquefied gas fuel remaining in the injection system can be reasonably retrieved through a passage different from the remaining fuel retrieving means. Accordingly, since the load on the remaining fuel retrieving means can be reduced, it is possible to achieve the effect and advantage of further reducing time taken to retrieve to the fuel tank the liquefied gas fuel remaining in the injection system by the remaining fuel retrieving means.

A twelfth aspect of the invention provides a liquefied gas fuel supply device for a diesel engine according to the eleventh aspect, characterized in that a check valve for holding pressure in the low-pressure tank is disposed between the compressor and the low-pressure tank.

Since the inside of the low-pressure tank is maintained at a predetermined pressure by the check valve, it is possible to achieve the effect and advantage of constantly maintaining at a low pressure the inside of the low-pressure tank brought to a low-pressure state by being sucked by the compressor.

A thirteenth aspect of the invention provides a liquefied gas fuel supply device for a diesel engine according to the eleventh aspect, characterized in that the remaining fuel retrieving means includes: the feed pipe opening/closing means and the fuel circulation pipe opening/closing means for switching a delivery port of the feed pipe to either one of an inlet of a circulation passage of the aspirator and an inlet of the fuel gallery and causing the delivery port to communicate with the either one; suction port opening/closing means for opening and closing communication between the suction port of the aspirator and the fuel gallery as well as the overflow fuel pipe; and a liquefied gas fuel retrieving control section capable of executing control to switch communication provided by each of the feed pipe opening/closing means and the fuel circulation pipe opening/closing means to the inlet of the aspirator, open the suction port opening/closing means, and form a flow passage through which the liquefied gas fuel delivered from the feed pump is to be circulated to the fuel tank, as well as control to open the vapor-phase pressure delivery pipe opening/closing means and, after the lapse of a predetermined time, close only the vapor-phase pressure delivery pipe opening/closing means.

A ring-shaped flow of liquefied gas fuel along which the liquefied gas fuel in the fuel tank flows from the inlet to the outlet of the aspirator and again returns to the fuel tank is formed by the feed pipe opening/closing means and fuel circulation pipe opening/closing means as well as the opening/closing operation of the suction port opening/closing means. At the same time, the vapor-phase pressure delivery pipe opening/closing means is opened, and the liquefied gas fuel in a liquid state remaining in the fuel gallery and the overflow fuel pipe is forcedly delivered under pressure to the remaining fuel retrieving means by the pressure of the vapor phase in the fuel tank. Then, only the vapor-phase pressure delivery pipe opening/closing means is closed after the lapse of a predetermined time, whereby the fuel gallery and the overflow fuel pipe are maintained in their low-pressure states.

Namely, after the liquefied gas fuel in a liquid state remaining in the fuel gallery and the overflow fuel pipe has been delivered under pressure by the pressure of the vapor phase, only the vapor-phase pressure delivery pipe opening/closing means is closed. Accordingly, the inside of the fuel gallery and that of the overflow fuel pipe are maintained in the lower-pressure states, whereby the vaporization of the liquefied gas fuel in a liquid state which slightly remains without being completely delivered under pressure can be accelerated. Accordingly, since the liquefied gas fuel in the fuel gallery and the overflow fuel pipe can be retrieved to the fuel tank in a far shorter time, it is possible to achieve the effect and advantage of further reducing time taken to retrieve the liquefied gas fuel remaining in the fuel gallery and the overflow fuel pipe to the fuel tank by the remaining fuel retrieving means.

A fourteenth aspect of the invention provides a liquefied gas fuel supply device for a diesel engine according to the thirteenth aspect, characterized in that the liquefied gas fuel retrieving control section is constructed to be able to execute control to open the purge pipe opening/closing means after closing the suction port opening/closing means.

After the stop of the diesel engine, the communication of the feed pipe opening/closing means and that of the fuel circulation pipe opening/closing means are switched to the inlet of the aspirator and the suction port opening/closing means is opened, whereby a ring-shaped flow of liquefied gas fuel along which the liquefied gas fuel in the fuel tank flows from the inlet to the outlet of the aspirator and again returns to the fuel tank is formed, and the liquefied gas fuel remaining in the fuel gallery and the overflow fuel pipe is sucked from the suction port of the aspirator and retrieved to the fuel tank. Then, the suction of the remaining fuel by this aspirator is continued for a predetermined time, and when the remaining fuel still remains, the suction port opening/closing means is closed to close the suction port of the aspirator. Then, the above-mentioned purge pipe opening/closing means is opened to cause the low-pressure tank and the overflow fuel pipe to communicate with each other, thereby rapidly sucking the remaining fuel by the negative pressure of the low-pressure tank. After the liquefied gas fuel remaining in the injection system has been retrieved to the fuel tank to some extent by the aspirator, the fuel remaining without being completely retrieved by the aspirator can be rapidly sucked and retrieved by the negative pressure of the low-pressure tank. Accordingly, it is possible to achieve the effect and advantage of further reducing time taken to retrieve liquefied gas fuel remaining in the injection system after the stop of the diesel engine.

A fifth aspect of the invention provides a liquefied gas fuel supply device for a diesel engine according to the third aspect or the fourth aspect, characterized in that the remaining fuel retrieving means includes: feed pipe opening/closing means for opening and closing communication of the feed pipe on the same side as the injection pump with respect to the branch point between the feed pipe and the fuel circulation pipe; fuel circulation pipe opening/closing means for opening and closing an inlet of the aspirator; suction port opening/closing means for opening and closing a communication pipe between the suction port of the aspirator and the fuel gallery as well as the overflow fuel pipe; and a liquefied gas fuel retrieving control section for executing control to open and close the feed pump, the feed pipe opening/closing means, the fuel circulation pipe opening/closing means, and the suction port opening/closing means. The liquefied gas fuel retrieving control section is constructed to be able to execute, after the stop of the diesel engine, control to close the feed pipe opening/closing means and cut off supply of liquefied gas fuel to the fuel gallery, and control to circulate the liquefied gas fuel delivered from the feed pump to the fuel tank via the fuel circulation pipe while causing the suction port of the aspirator to communicate with the fuel gallery as well as the overflow fuel pipe, by executing control to open the fuel circulation pipe opening/closing means and the suction port opening/closing means.

After the stop of the diesel engine, the feed pipe opening/closing means is controlled to be closed and cut off the supply of liquefied gas fuel to the fuel gallery, and the fuel circulation pipe opening/closing means and the suction port opening/closing means are controlled to be opened and form a circulation passage along which the liquefied gas fuel delivered from the feed pump is circulated to the fuel tank via the fuel circulation pipe with the suction port of the aspirator communicating with the fuel gallery as well as the overflow fuel pipe. The liquefied gas fuel delivered from the feed pipe flows into the fuel circulation pipe, then flows from the inlet to the outlet of the aspirator, and again returns to the fuel tank. A ring-shaped flow of liquefied gas fuel including the aspirator is formed and suction force is produced in the suction port of the aspirator. The liquefied gas fuel remaining in the fuel gallery and the overflow fuel pipe is sucked from the suction port of the aspirator, and is retrieved to the fuel tank together with liquefied gas fuel flowing from the inlet to the outlet of the aspirator.

In this manner, the fuel circulation pipe opening/closing means capable of opening and closing the inlet of the aspirator is disposed in the fuel circulation pipe, and the feed pipe opening/closing means capable of opening and closing the communication of the feed pipe on the same side as the injection pump with respect to the branch point between the feed pipe and the fuel circulation pipe is disposed in the feed pipe, and the liquefied gas fuel retrieving control section executes control to open and close the fuel circulation pipe opening/closing means and the feed pipe opening/closing means. Therefore, the opening and closing of the fuel circulation pipe on the side of the inlet of the aspirator and the opening and closing of the feed pipe on the same side as the injection pump with respect to the branch point between the feed pipe and the fuel circulation pipe can be independently performed.

Accordingly, according to the liquefied gas fuel supply device for a diesel engine according to the fifteenth aspect of the invention, the liquefied gas fuel retrieving control section can execute control to open and close the feed pipe opening/closing means and the fuel circulation pipe opening/closing means, whereby it is possible to achieve the effect and advantage achieved by the third aspect or the fourth aspect of the invention.

A sixteenth aspect of the invention provides a liquefied gas fuel supply device for a diesel engine according to the fifteenth aspect, characterized in that the liquefied gas fuel retrieving control section is constructed to be able to execute control to hold the liquefied gas fuel in the state of being charged in the feed pipe between the feed pipe opening/closing means and the check valve, while continuing control to close the feed pipe opening/closing means, after having retrieving to the fuel tank the liquefied gas fuel remaining in the fuel gallery and the overflow fuel pipe.

In this manner, since the liquefied gas fuel is held in the state of being charged in the feed pipe between the feed pipe opening/closing means and the check valve, with the feed pipe opening/closing means controlled to be closed, after the liquefied gas fuel remaining in the fuel gallery and the overflow fuel pipe has been retrieved to the fuel tank, it is possible to reduce the amount of liquefied gas fuel to be retrieved by the remaining fuel retrieving means after the stop of the diesel engine, and it is also possible to reduce the amount of liquefied gas fuel to be charged into the injection system at the starting time of the diesel engine.

A seventeenth aspect of the invention provides a liquefied gas fuel supply device for a diesel engine according to the fifteenth aspect, characterized in that in the remaining fuel retrieving means, the aspirator and the fuel circulation pipe opening/closing means are disposed immediately close to the fuel tank.

In this manner, by making the length of the fuel circulation pipe as short as possible, it is possible to minimize the flow passage resistance of the fuel circulation pipe. Accordingly, it is possible to minimize a decrease in the flow rate of liquefied gas fuel flowing in the circulation passage, and it is possible to minimize a decrease in the flow rate of suction force produced in the suction port of the aspirator, whereby it is possible to further improve the efficiency of retrieving of remaining fuel by the aspirator.

An eighteenth aspect of the invention provides a liquefied gas fuel supply device for a diesel engine according to the fifteenth aspect, characterized in that in the remaining fuel retrieving means, the feed pipe opening/closing means is disposed in the feed pipe in the vicinity of an inlet of the fuel gallery, and the check valve is disposed immediately close to the branch point between the feed pipe and the fuel circulation pipe.

In this manner, the feed pipe opening/closing means is disposed in the vicinity of the inlet of the fuel gallery of the injection pump, and the check valve is disposed immediately close to the branch point between the feed pipe and the fuel circulation pipe. Accordingly, by closing the feed pipe opening/closing means, the liquefied gas fuel can be held in the state of being charged in the feed pipe between the vicinity of the inlet of the fuel gallery of the injection pump and the close vicinity of the branch point between the feed pipe and the fuel circulation pipe. In addition, since the liquefied gas fuel is also held in the state of being charged between the fuel tank and the check valve, when the liquefied gas fuel is to be charged into the injection system at the starting time of the diesel engine, the liquefied gas fuel can start to be charged into the fuel gallery of the injection pump at approximately the same time as the start of charging. Accordingly, it is possible to further reduce time taken to charge the liquefied gas fuel into the injection system at the starting time of the diesel engine.

A nineteenth aspect of the invention provides a liquefied gas fuel supply device for a diesel engine according to the fifth aspect, characterized in that the liquefied gas fuel retrieving control section is constructed to be able to execute control to open the vapor-phase pressure delivery pipe opening/closing means and deliver vapor-phase pressure in the fuel tank to the fuel gallery and the overflow fuel pipe.

By opening the vapor-phase pressure delivery pipe opening/closing means, it is possible to forcedly deliver the liquefied gas fuel remaining in the fuel gallery and the overflow fuel pipe to the remaining fuel retrieving means by the pressure of the vapor phase in the fuel tank. Accordingly, it is possible to achieve the effect and advantage of further reducing time taken to retrieve the liquefied gas fuel remaining in the fuel gallery and the overflow fuel pipe to the fuel tank by the remaining fuel retrieving means.

A twentieth aspect of the invention provides a liquefied gas fuel supply device for a diesel engine according to the eleventh aspect, characterized in that the liquefied gas fuel retrieving control section is constructed to be able to execute, after the stop of a diesel engine, control to close the feed pipe opening/closing means and cut off supply of liquefied gas fuel to the fuel gallery, and execute, after stopping the feed pump with the suction port opening/closing means closed, control to open the purge pipe opening/closing means and suck the liquefied gas fuel remaining in the fuel gallery and the overflow fuel pipe to the low-pressure tank.

After the stop of the diesel engine, the feed pipe opening/closing means is controlled to be closed and cut off the supply of the liquefied gas fuel to the fuel gallery, and when the feed pump is stopped with the suction port opening/closing means closed, the fuel gallery and the overflow fuel pipe are separated from the feed pipe and the aspirator. Then, the above-mentioned purge pipe opening/closing means is opened to cause the low-pressure tank and the overflow fuel pipe to communicate with each other, and the fuel remaining in the fuel gallery and the overflow fuel pipe is sucked by the negative pressure of the low-pressure tank. In this manner, by retrieving the fuel remaining in the fuel gallery and the overflow fuel pipe by the negative pressure of the low-pressure tank, it is possible to achieve the effect and advantage of further reducing time taken to retrieve the liquefied gas fuel remaining in the injection system by the aspirator after the stop of the diesel engine.

BEST MODE FOR CARRYING OUT THE INVENTION

Embodiments of the invention of the present application will be described below with reference to the accompanying drawings.

Figure 1:
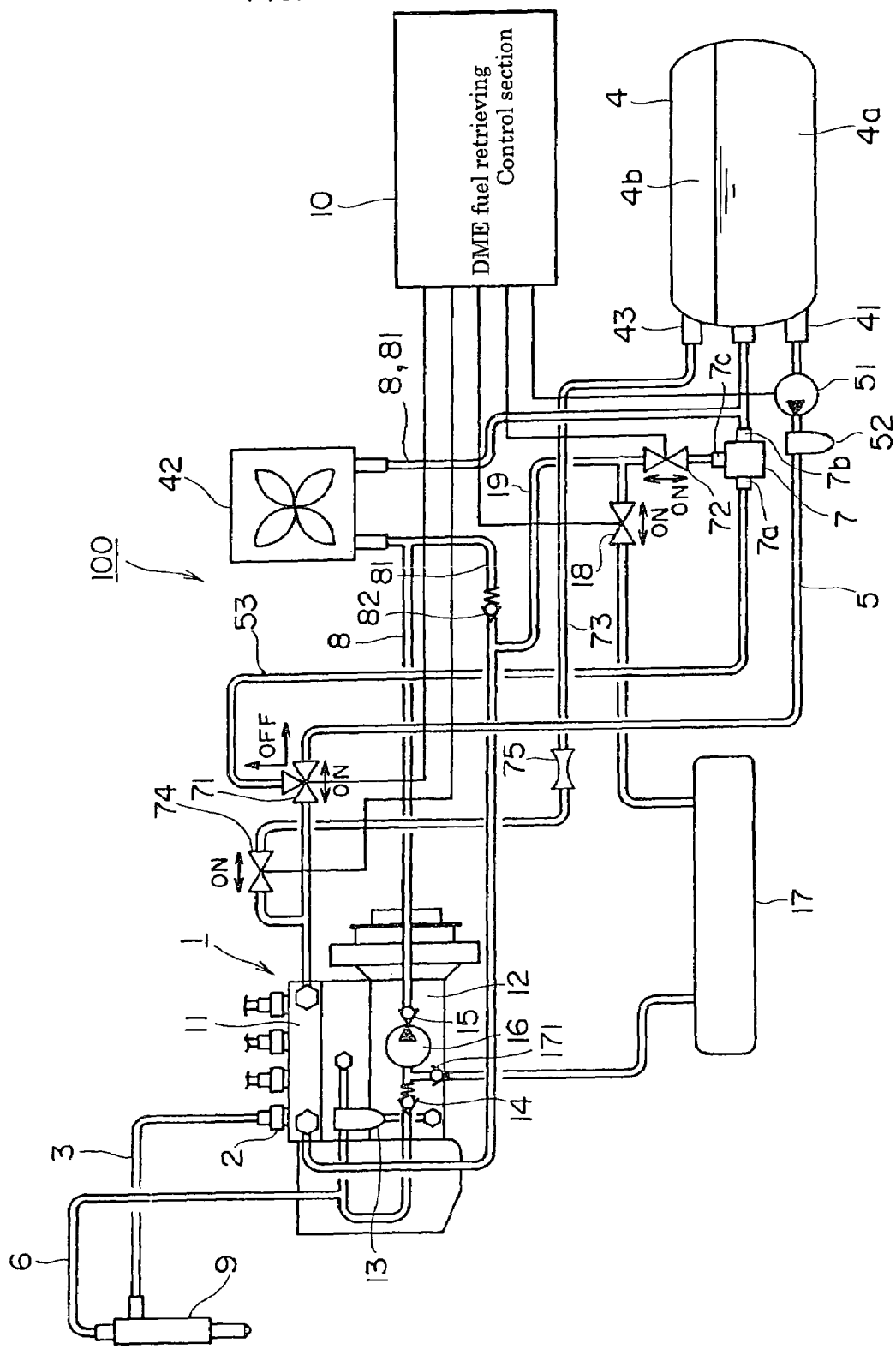
FIG. 1 is a schematic diagram showing a first embodiment of a DME fuel supply device according to the invention.

First, a schematic structure of a liquefied gas fuel supply device for a diesel engine will be described. FIG. 1 is a schematic diagram showing a first embodiment of a liquefied gas fuel supply device for a diesel engine according to the invention of the present application.

A liquefied gas fuel supply device 100 which supplies liquefied gas fuel to a diesel engine has an injection pump 1. Representative examples of liquefied gas fuel are DME and high cetane number LP gas (LP gas to which a cetane number improver is added) having a cetane number of approximately 40-55, desirably, 50 or higher. In embodiments which will be described later, reference will be made to examples in which DME is used as liquefied gas fuel. Incidentally, when high cetane number LP gas is used, a known material such as a nitric ester, a nitrite and an organic peroxide are used as a cetane number improver. A specific cetane number improver is DTBP (Di-tertiary butyl peroxide) or 2HEN (2-Ethylhexylnitrate). In addition, since LP gas is low in lubrication ability compared to light oil, a known alkyl ester is desirably added to LP gas as a lubrication improver.

The injection pump 1 has the same number of injection pump elements 2 as the number of cylinders which the diesel engine has. A feed pump 51 pressurizes DME fuel reserved in a fuel tank 4 to a predetermined pressure and delivers the DME fuel into a feed pipe 5. A DME fuel delivery port 41 of the fuel tank 4 is provided below the level of a liquid phase 4a in the fuel tank 4, and the feed pump 51 is disposed in the vicinity of the DME fuel delivery port 41 of the fuel tank 4. The DME fuel delivered into the feed pipe 5 is filtered by a filter 52, and is delivered to the injection pump 1 via a three-way solenoid valve 71. During an injection state (during the operation of the diesel engine), the three-way solenoid valve 71 is ON and permitted to communicate in the directions shown in FIG. 1.

A cam chamber 12 in the injection pump 1 is a dedicated lubricating system separated from a lubricating system for the diesel engine, and an oil separator 13 separates DME fuel and a lubricating oil from the lubricating oil in the cam chamber 12 that is mixed with DME fuel which has leaked into the cam chamber 12 in the injection pump 1, and returns the lubricating oil to the cam chamber 12. The DME fuel separated by the oil separator 13 is delivered to a compressor 16 via a check valve (nonreturn valve) 14 which prevents the pressure inside the cam chamber 12 from becoming not higher than atmospheric pressure, and the DME fuel, after having been pressurized by the compressor 16, is returned to the fuel tank 4 via a check valve (nonreturn valve) 15 and a cooler 42. The check valve 15 is provided for preventing DME fuel from flowing back to the cam chamber 12 from the fuel tank 4 during the stop of the diesel engine. The compressor 16 is a compressor which uses a cam in the cam chamber 12 as its driving force source. Accordingly, a more power-saving DME fuel supply device 100 can be realized.

The DME fuel which has been pressurized to the predetermined pressure by the feed pump 51 and delivered from the fuel tank 4 is delivered under pressure by a predetermined amount at predetermined timing from each of the injection pump elements 2 of the injection pump 1 to a fuel injection nozzle 9 disposed in each of the cylinders of the diesel engine via an injection pipe 3. An overflow fuel pipe 81 is provided with an overflow valve 82 which maintains the pressure of DME fuel in a fuel gallery 11 at a predetermined pressure and regulates the flowing direction of DME fuel in only the direction in which overflowed DME fuel is allowed to return to the fuel tank 4. The DME fuel which has overflowed from the injection pump 1 passes through the overflow fuel pipe 81 and is returned to the fuel tank 4 via the overflow valve 82 and the cooler 42. The DME fuel which has overflowed from each of the fuel injection nozzles 9 is returned to the fuel tank 4 via a nozzle return pipe 6, an overflow return pipe 8, and the cooler 42.

The DME fuel supply device 100 also has "remaining fuel retrieving means" for retrieving to the fuel tank 4 the DME fuel remaining in the fuel gallery 11 in the injection pump 1 as well as in the overflow fuel pipe 81 during the stop of the diesel engine. The "remaining fuel retrieving means" has an aspirator 7, the three-way solenoid valve 71, a two-way solenoid valve 72 and a DME fuel retrieving control section 10. The DME fuel retrieving control section 10 detects the operating/stopped state of the diesel engine (the injection/non-injection state of the DME fuel supply device 100), and executes ON/OFF control on the three-way solenoid valve 71, the two-way solenoid valve 72 and the feed pump 51 according to each of the states. During the stop of the diesel engine, the DME fuel retrieving control section 10 executes control to retrieve the DME fuel remaining in the fuel gallery 11 and the overflow fuel pipe 81.

The aspirator 7 has an inlet 7a, an outlet 7b and a suction port 7c. The inlet 7a and the outlet 7b straightforwardly communicate with each other, and the suction port 7c is branched in an approximately perpendicular direction from the communication passage between the inlet 7a and the outlet 7b. The outlet side of a communication passage which is permitted to communicate when the three-way solenoid valve 71 is OFF is connected to the inlet 7a, and the outlet 7b is connected to a passage to the fuel tank 4 via the cooler 42. The suction port 7c is connected to the two-way solenoid valve 72 serving as suction port opening/closing means which is closed in an OFF state during the injection state (during the operation of the diesel engine). FIG. 1 shows the vertical positional relationship between constituent elements (as in the following drawings), and the aspirator 7 is disposed at a position lower than the overflow fuel pipe 81.

The "remaining fuel retrieving means" also has a vapor-phase pressure delivery pipe 73 and a vapor-phase pressure delivery pipe opening/closing solenoid valve 74 for opening and closing the communication of the vapor-phase pressure delivery pipe 73, as means for connecting an outlet for a vapor phase 4b in the fuel tank 4 (a vapor-phase delivery port 43) and an inlet side of the fuel gallery 11 of the injection pump 1. The vapor-phase pressure delivery pipe 73 has a throttling portion 75 whose inside diameter is partially reduced, and the vapor-phase pressure delivery pipe opening/closing solenoid valve 74 is disposed at a position higher than the fuel gallery 11 of the injection pump 1. The vapor-phase pressure delivery pipe opening/closing solenoid valve 74 is ON/OFF controlled by the DME fuel retrieving control section 10 so that the communication of the vapor-phase pressure delivery pipe 73 is opened when the vapor-phase pressure delivery pipe opening/closing solenoid valve 74 is in its ON control state.

The DME fuel supply device 100 further has a low-pressure tank 17 having a hermetically sealed structure smaller in capacity than the fuel tank 4. The low-pressure tank 17 is constructed so that its internal pressure is brought to a low-pressure state when the low-pressure tank 17 is sucked by the compressor 16, and so that the low-pressure state is maintained by a check valve 171 even when the compressor 16 stops. The low-pressure tank 17 communicates with the overflow fuel pipe 81 upstream of the overflow valve 82 through a purge pipe 19, and the purge pipe 19 is provided with a purge pipe opening/closing solenoid valve 18 capable of opening and closing the purge pipe 19. The purge pipe opening/closing solenoid valve 18 is controlled by the DME fuel retrieving control section 10, and during the stop of the diesel engine, the purge pipe opening/ closing solenoid valve 18 is turned on and brought to its open state so that the low-pressure tank 17 and the overflow fuel pipe 81 communicate with each other, while during the operation of the diesel engine, the purge pipe opening/closing solenoid valve 18 is turned off and brought to its closed state so that the communication between the low-pressure tank 17 and the overflow fuel pipe 81 is cut off.

Next, the states of control of each of the three-way solenoid valve 71, the two-way solenoid valve 72, the vapor-phase pressure delivery pipe opening/closing solenoid valve 74, the purge pipe opening/closing solenoid valve 18, and the feed pump 51 by the DME fuel retrieving control section 10 in the DME fuel supply device 100 during stop, fuel charging, engine operation and retrieving of remaining fuel will be described with reference to the corresponding drawings.

Figure 2:
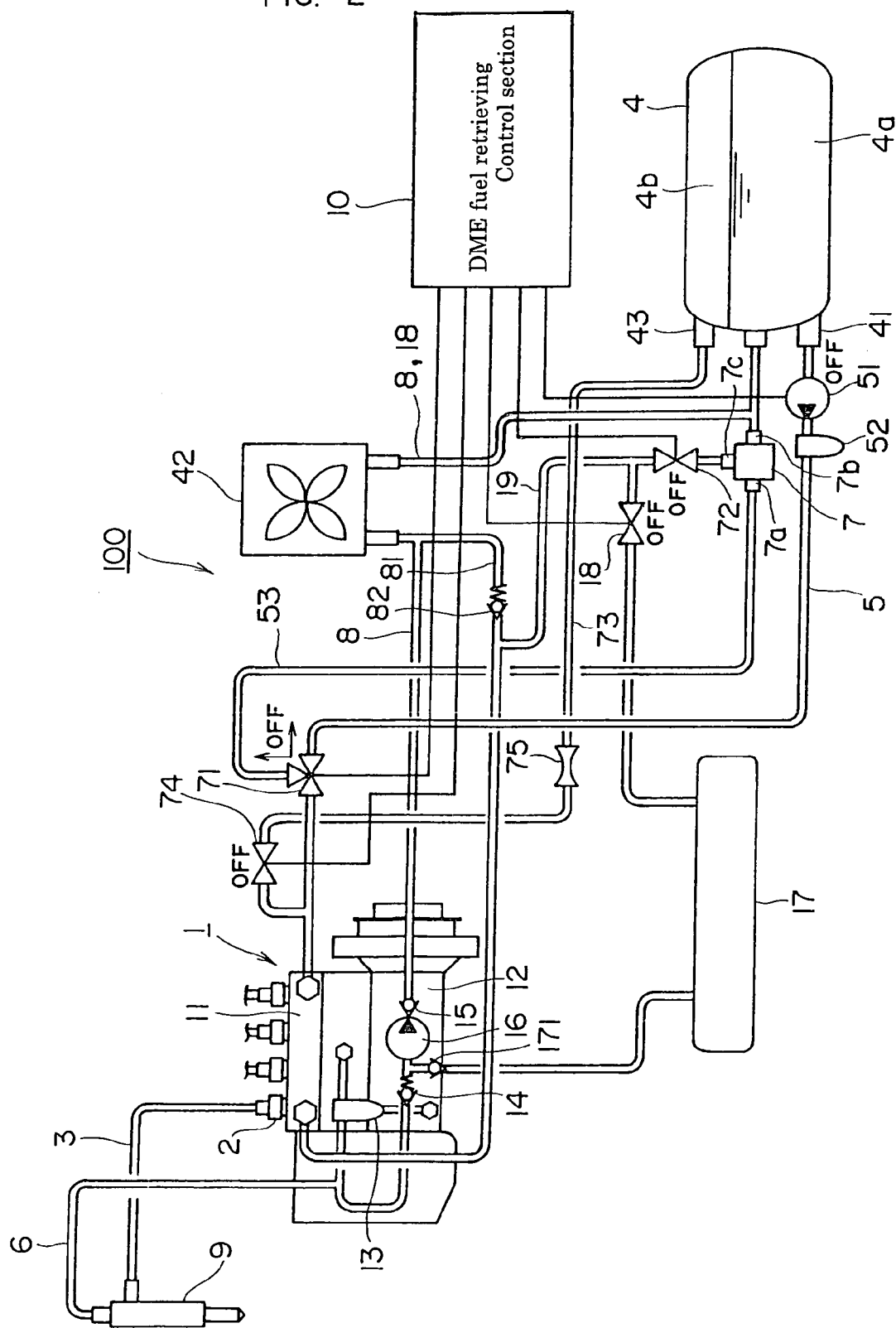
FIG. 2 is a schematic diagram showing the stopped state of the DME fuel supply device according to the first embodiment of the invention.

FIG. 2 is a schematic diagram showing the stopped state of the DME fuel supply device 100 according to the invention of the present application.

During stop, the DME fuel retrieving control section 10 executes OFF control on all of the three-way solenoid valve 71, the two-way solenoid valve 72, the vapor-phase pressure delivery pipe opening/closing solenoid valve 74, the purge pipe opening/closing solenoid valve 18, and the feed pump 51. During the OFF control, the feed pump 51 is stopped, and the three-way solenoid valve 71 forms a passage which permits the feed pipe 5 to communicate with the inlet 7a of the aspirator 7 via a fuel circulation pipe 53, and the two-way solenoid valve 72, the vapor-phase pressure delivery pipe opening/closing solenoid valve 74 and the purge pipe opening/closing solenoid valve 18 are brought to their closed states.

Figure 3:
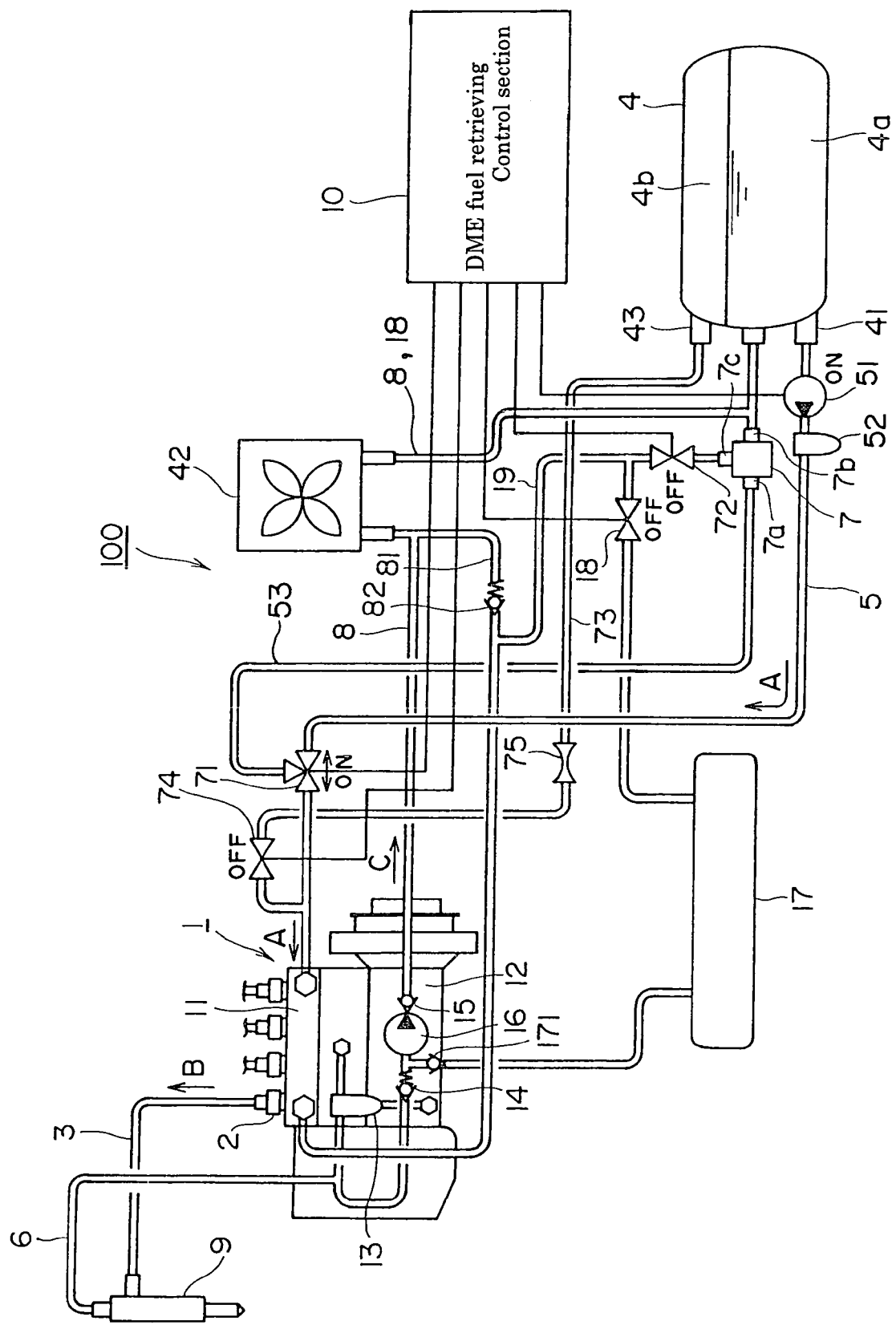
FIG. 3 is a schematic diagram showing the state of the DME fuel supply device according to the first embodiment of the invention during fuel charging as well as during operation.

FIG. 3 is a schematic diagram showing the state of the DME fuel supply device 100 according to the invention of the present application during fuel charging as well as during operation.

During the fuel charging of charging DME fuel into an injection system such as the fuel gallery 11 from the stopped state, the DME fuel retrieving control section 10 executes ON control on the three-way solenoid valve 71, and then executes ON control on the feed pump 51. The three-way solenoid valve 71 is ON controlled so that the communication passage of the feed pipe 5 switches from the inlet 7a of the aspirator 7 to the fuel gallery 11 and the DME fuel of the fuel tank 4 is delivered under pressure to the fuel gallery 11 by the feed pump 51 (symbol A). When the DME fuel is charged into the fuel gallery 11, the injection pipe 3 and the overflow fuel pipe 81 (the fuel-gallery side of the overflow valve 82) (symbol B), the diesel engine is brought to its operable state. When the diesel engine in this state is started and reaches its operating state, the cam in the cam chamber 12 of the injection pump 1 rotates in conjunction with the operation of the diesel engine, thereby operating the compressor 16. As described above, DME fuel which has entered the cam chamber 12 is separated by the oil separator 13 and is then returned to the fuel tank 4 by being sucked by the compressor 16 (symbol C). The inside of the low-pressure tank 17 is also sucked by the compressor 16 and maintained in the low-pressure state.

Figure 4:
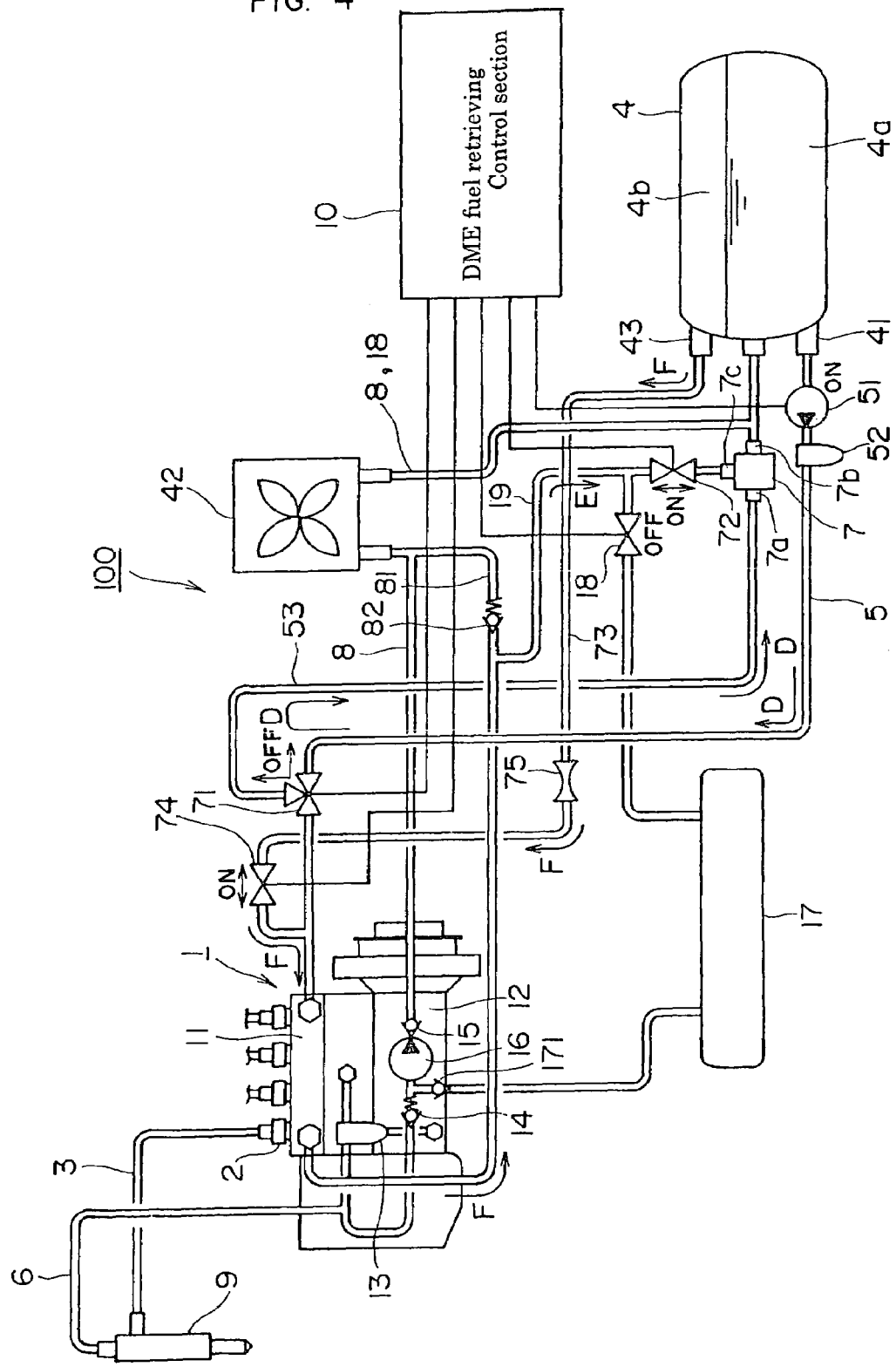
FIG. 4 is a schematic diagram showing the state of the DME fuel supply device according to the first embodiment of the invention during the retrieving of remaining fuel, and shows the state in which DME fuel is being retrieved by an aspirator (vapor-phase substitution)

FIG. 4 is a schematic diagram showing the state of the DME fuel supply device 100 according to the invention of the present application during the retrieving of remaining fuel, and shows the state in which DME fuel is being retrieved by the aspirator 7 (vapor-phase substitution).

After the diesel engine has been stopped, in order to retrieve to the fuel tank the DME fuel remaining in the fuel gallery 11, the injection pipe 3 and the overflow fuel pipe 81, the DME fuel retrieving control section 10 turns off the three-way solenoid valve 71 to form the communication passage from the feed pipe 5 to the inlet 7a of the aspirator 7, as well as turns on the two-way solenoid valve 72 to provide communication between the overflow fuel pipe 81 upstream of the overflow valve 82 and the suction port 7c of the aspirator 7. Accordingly, the DME fuel delivered from the feed pump 51 is delivered not to the injection pump 1 but to the aspirator 7, passed from the inlet 7a to the outlet 7b, returned to the fuel tank 4 via the overflow fuel pipe 81 downstream of the overflow valve 82, the overflow return pipe 8 and cooler 42 and again delivered from the feed pump 51 to the aspirator 7. Namely, DME fuel liquid is circulated via the aspirator 7 (symbol D). The DME fuel remaining in the fuel gallery 11 in the injection pump 1 as well as in the overflow fuel pipe 81 upstream of the overflow valve 82 is vaporized, i.e., substituted by a vapor phase, by suction force produced by the flow of DME fuel which flows from the inlet 7a to the outlet 7b through the circulation of the remaining DME fuel, and is sucked through the suction port 7c and absorbed into the DME fuel flowing from the inlet 7a to the outlet 7b, and is retrieved to the fuel tank 4 (symbol E).

At the same time that the DME fuel of the fuel gallery 11 and the overflow fuel pipe 81 is retrieved to the fuel tank 4 by being sucked by the aspirator, the DME fuel retrieving control section 10 also executes ON control on the vapor-phase pressure delivery pipe opening/closing solenoid valve 74 and brings the vapor-phase pressure delivery pipe 73 which connects the vapor phase 4b of the fuel tank 4 and the inlet of the fuel gallery 11, into a communicating state. The DME fuel in a liquid state remaining in the fuel gallery 11 and the overflow fuel pipe 81 is delivered under pressure to the suction port 7c of the aspirator 7 by the high pressure of the vapor phase 4b (symbol F). In addition, this pressure is compressed to a far higher pressure by the throttling section 75 where the inside diameter of the vapor-phase pressure delivery pipe 73 is partially reduced, whereby the remaining DME fuel can be delivered under pressure by a far higher pressure.

Accordingly, since the DME fuel in a liquid state is delivered under pressure to the suction port 7c of the aspirator 7 by using the pressure of the vapor phase 4b, it is possible to reduce time taken to retrieve the DME fuel remaining in the fuel gallery 11 and the overflow fuel pipe 81. The DME fuel retrieving control section 10, after the lapse of a predetermined time, closes only the vapor-phase pressure delivery pipe opening/closing solenoid valve 74 and cuts off the communication with the vapor phase 4b in a high-pressure state. Accordingly, since the inside of the fuel gallery 11 and that of the overflow fuel pipe 81 can be brought into lower-pressure states, the vaporization of the DME fuel in a liquid state which remains without being delivered under pressure by vapor phase pressure can be accelerated, whereby it is possible to further reduce time taken to retrieve the remaining DME fuel by the "remaining fuel retrieving means".

In addition, in the DME fuel supply device 100 according to the invention of the present application, since the aspirator 7 is disposed at a position lower than the fuel gallery 11 and the overflow fuel pipe 81, the DME fuel remaining in the fuel gallery 11 and the overflow fuel pipe 81 is retrieved to the fuel tank 4 by a combined force of gravity and the suction force produced in the suction port 7c of the aspirator 7. Accordingly, it is possible to more efficiently retrieve the DME fuel remaining in the injection system by using gravity, and it is possible to further reduce time taken to retrieve the DME fuel in the injection system to the fuel tank 4 after the stop of the diesel engine.

In addition, since the vapor-phase pressure delivery pipe opening/closing solenoid valve 74 is disposed at a position higher than the fuel gallery 11, the DME fuel in a liquid state remaining in the fuel gallery 11 and the overflow fuel pipe 81 is forcedly delivered under pressure to the suction port 7c of the aspirator 7 by a combined force of gravity and the pressure of the vapor phase 4b in the fuel tank 4. Accordingly, gravity can be used to more efficiently deliver under pressure the DME fuel in a liquid state remaining in the fuel gallery 11 and the overflow fuel pipe 81 to the suction port 7c of the aspirator 7, whereby it is possible to further reduce time taken to retrieve the DME fuel remaining in the fuel gallery 11 and the overflow fuel pipe 81 to the fuel tank 4.

Figure 5:
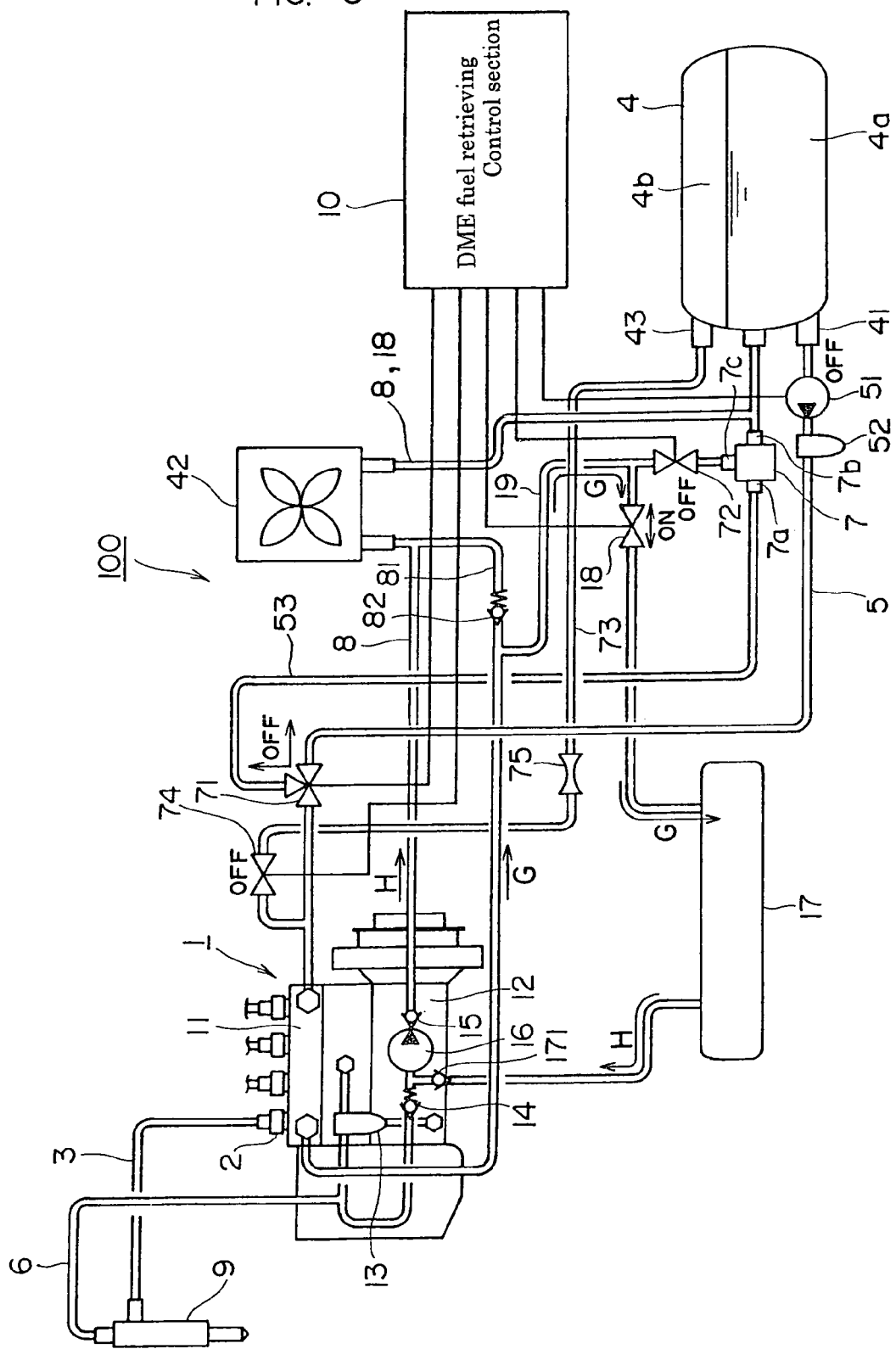
FIG. 5 is a schematic diagram showing the state of the DME fuel supply device according to the first embodiment of the invention during the retrieving of remaining fuel, and shows the state in which DME fuel is being sucked into a low-pressure tank.

FIG. 5 is a schematic diagram showing the state of the DME fuel supply device 100 according to the invention of the present application during the retrieving of remaining fuel, and shows the state in which DME fuel is being sucked into the low-pressure tank 17.

After the DME fuel retrieving control section 10 has retrieved the DME fuel remaining in the fuel gallery 11 and the overflow fuel pipe 81, by means of the aspirator 7 for a predetermined time, the DME fuel retrieving control section 10 executes OFF control to stop the feed pump 51, and executes OFF control on the two-way solenoid valve 72 to cut off the communication between the overflow fuel pipe 81 and the suction port 7c of the aspirator 7. Then, the DME fuel retrieving control section 10 executes ON control on the purge pipe opening/closing solenoid valve 18 to provide communication between the low-pressure tank 17 maintained in an approximately constant low pressure state and the overflow fuel pipe 81. The residual DME fuel remaining in the overflow fuel pipe 81 is sucked and retrieved to the low-pressure tank 17 by the negative pressure in the low-pressure tank 17 (symbol G). When the diesel engine again starts and the compressor 16 is activated, the DME fuel sucked into the low-pressure tank 17 is sucked by the compressor 16 and is retrieved to the fuel tank 4 through the overflow return pipe 8 (symbol H).

Accordingly, since the purge pipe opening/closing solenoid valve 18 is turned on after the DME fuel remaining in the fuel gallery 11 and the overflow fuel pipe 81 has been retrieved to some extent by the aspirator 7, the DME fuel remaining without being completely retrieved by the aspirator 7 can be rapidly sucked and retrieved into the low-pressure tank 17. Accordingly, it is possible to further reduce time taken to retrieve DME fuel by the "remaining fuel retrieving means".

In this manner, it is possible to reduce time taken to retrieve the DME fuel in the injection system to the fuel tank 4 after the stop of the diesel engine.

As another embodiment, there is provided the DME fuel supply device 100 for a common rail diesel engine in which a common rail is provided between the injection pump 1 and the injection nozzle 9 in the above-mentioned first embodiment.

Figure 6:
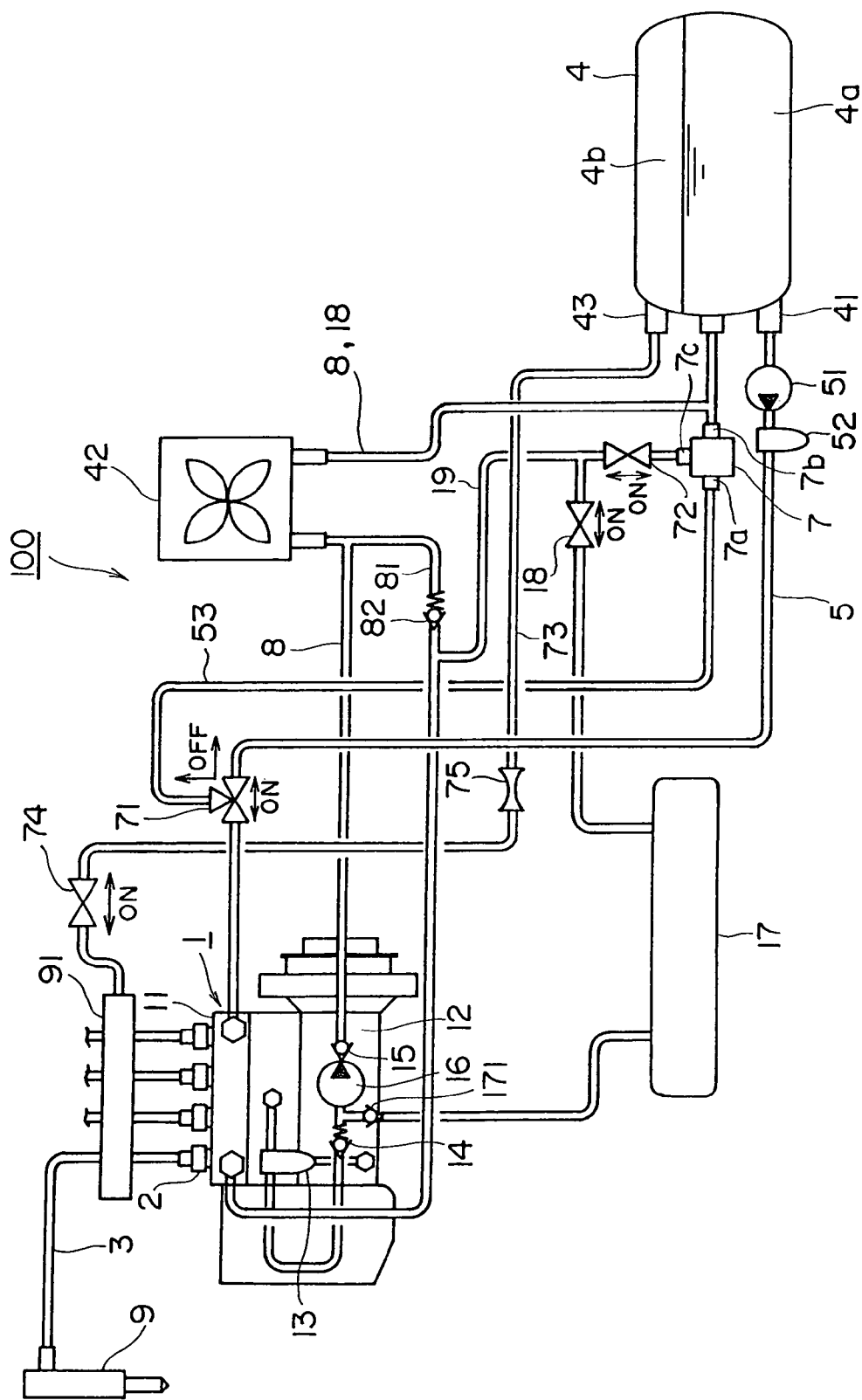
FIG. 6 is a schematic diagram showing a second embodiment of the DME fuel supply device according to the invention, and shows a DME fuel supply device for a common rail diesel engine in which a vapor-phase pressure delivery pipe is connected to a common rail.
Figure 7:
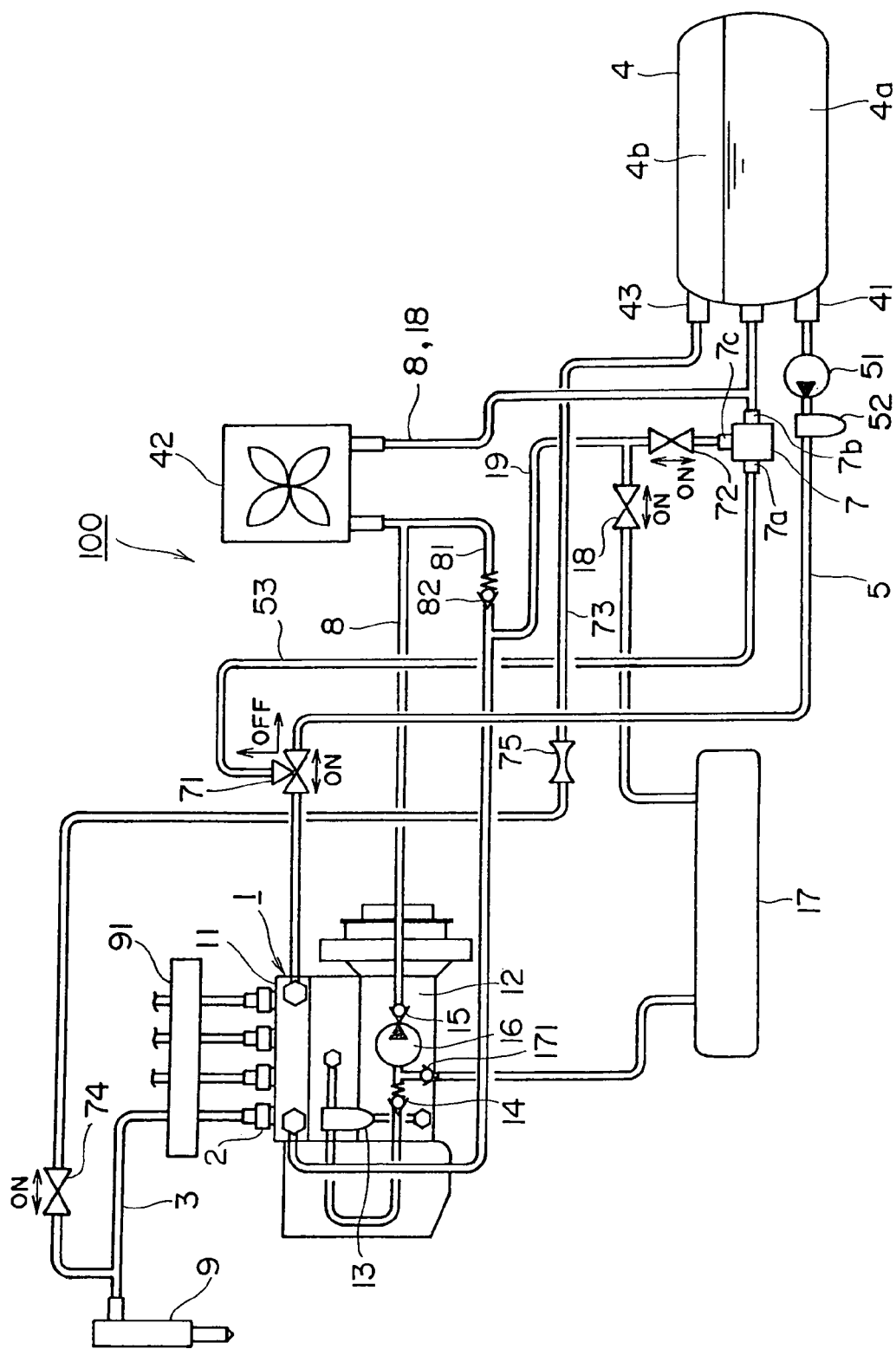
FIG. 7 is a schematic diagram showing a third embodiment of the DME fuel supply device according to the invention, and shows a DME fuel supply device for a common rail diesel engine in which the vapor-phase pressure delivery pipe is connected to an injection pipe.

FIG. 6 is a schematic diagram showing a second embodiment of the DME fuel supply device 100 according to the invention of the present application, and shows the DME fuel supply device 100 for a common rail diesel engine in which the vapor-phase pressure delivery pipe 73 is connected to a common rail. FIG. 7 is a schematic diagram showing a third embodiment of the DME fuel supply device 100 according to the invention of the present application, and shows the DME fuel supply device 100 for a common rail diesel engine in which the vapor-phase pressure delivery pipe 73 is connected to the injection pipe 3.

In the above-mentioned first embodiment, the injection nozzle 9 is constructed to be opened for injection of DME fuel by the pressure of DME fuel delivered under pressure from the injection pump 1 to the injection pipe 3. For this reason, when the injection pipe 3 is connected to the vapor-phase pressure delivery pipe 73, there is a possibility that the pressure in the injection pipe 3 becomes unstable, and there is a risk that the fuel injection characteristics of the injection nozzle 9 become unstable. Therefore, the vapor-phase pressure delivery pipe 73 cannot be connected to the injection pipe 3.

On the other hand, the DME fuel supply device 100 for a common rail diesel engine has a construction in which DME fuel is delivered under pressure from the injection pump 1 to a common rail 91 and the DME fuel in the common rail 91 maintained in a given high-pressure state is delivered to each injection nozzle 9. For this reason, the common rail diesel engine adopts an electromagnetic type of valve opening mechanism. This injection nozzle 9 is not easily influenced by pressure variations in the injection pipe 3.

Accordingly, in the DME fuel supply device 100 for a common rail diesel engine, as shown in FIG. 6, the vapor-phase pressure delivery pipe 73 can be connected to the common rail 91 (embodiment 2). Accordingly, after the stop of the diesel engine while the DME fuel remaining in the common rail 91, the fuel gallery 11 and the overflow fuel pipe 81 is being retrieved to the fuel tank 4 by the above-mentioned "remaining fuel retrieving means", the DME fuel in a liquid state remaining in the common rail 91 can be forcedly delivered under pressure to the aspirator 7 by the pressure of the vapor phase 4b in the fuel tank 4. Accordingly, it is possible to further reduce time taken to retrieve the DME fuel remaining in the common rail 91 to the fuel tank 4 by means of the aspirator 7. In addition, since the vapor-phase pressure delivery pipe opening/closing solenoid valve 74 which opens and closes the vapor-phase pressure delivery pipe 73 is disposed at a position higher than the common rail 91, the DME fuel in a liquid state remaining in the common rail 91 can be forcedly delivered under pressure to the aspirator 7 by a combined force of gravity and vapor phase pressure. As to the second embodiment (FIG. 6) and the third embodiment (FIG. 7), the description of sections which have the same constructions as the corresponding ones of the first embodiment is omitted herein.

Furthermore, in the DME fuel supply device 100 for a common rail diesel engine, as shown in FIG. 7, the vapor-phase pressure delivery pipe 73 may also be connected to the vicinity of the injection nozzle 9 of the injection pipe 3 (the inlet side of the injection nozzle 9) (embodiment 3). If the vapor-phase pressure delivery pipe 73 is connected in this manner to the vicinity of the injection nozzle 9 of the injection pipe 3 disposed at a position far higher than the common rail 91, not only the DME fuel remaining in the common rail 91 but also the DME fuel remaining in the injection pipe 3 can be delivered under pressure directly to the aspirator 7 by vapor phase pressure. Accordingly, it is possible to further reduce time taken to retrieve the DME fuel remaining in the common rail 91 and the injection pipe 3 to the fuel tank 4 by means of the aspirator 7. In addition, since the vapor-phase pressure delivery pipe opening/closing solenoid valve 74 which opens and closes the vapor-phase pressure delivery pipe 73 is disposed at a position higher than the injection pipe 3, the DME fuel in a liquid state remaining in the injection pipe 3 can be more efficiently forcedly delivered under pressure to the aspirator 7 by a combined force of gravity and vapor phase pressure.

Figure 8:
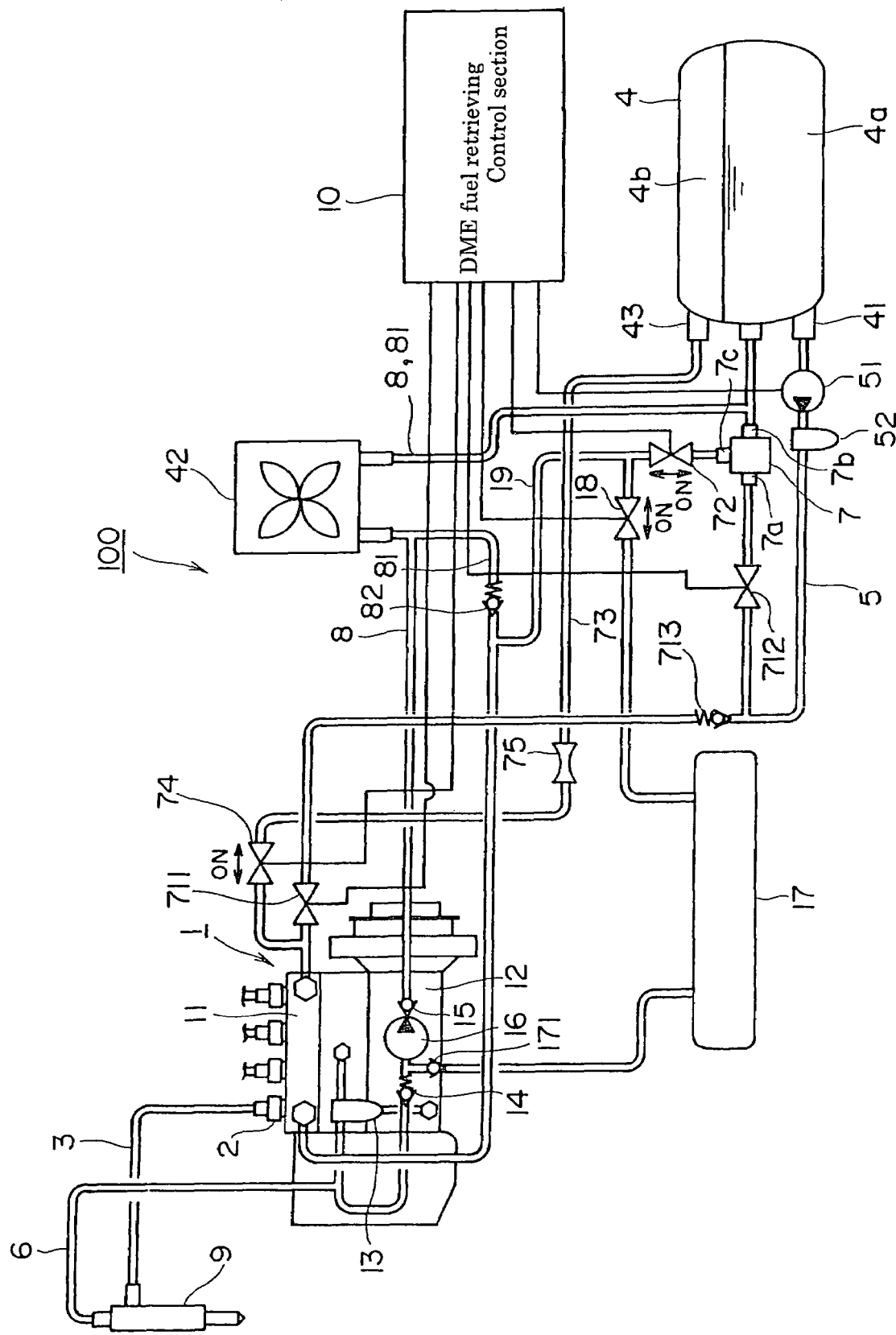
FIG. 8 is a schematic diagram showing a fourth embodiment of the DME fuel supply device according to the invention.

FIG. 8 shows the case in which the three-way solenoid valve 71 in the first embodiment shown in FIG. 1 is divided into a two-way solenoid valve 711 which serves as feed pipe opening/closing means and a two-way solenoid valve 712 which serves as fuel circulation pipe opening/closing means (fourth embodiment). Specifically, a check valve 713 is disposed between a position where the fuel circulation pipe 53 is branched from the feed pipe 5 and the two-way solenoid valve serving as feed pipe opening/closing means (hereinafter referred to as the "feed pipe opening/closing solenoid valve") 711, and serves to prevent liquefied gas fuel from flowing back from the injection pump 1. Furthermore, the two-way solenoid valve serving as fuel circulation pipe opening/closing means for opening and closing the flow passage of the fuel circulation pipe 53 (hereinafter referred to as the "fuel circulation pipe opening/closing solenoid valve") 712 is disposed in the fuel circulation pipe 53. The other sections are identical in construction to the corresponding one of the first embodiment, and the same description is omitted herein. In this manner, the three-way solenoid valve 71 is divided into the feed pipe opening/closing solenoid valve 711 and the fuel circulation pipe opening/closing solenoid valve 712, and further, the check valve 713 is disposed, whereby each of the values 711 and 712 can be individually controlled to be opened and closed, and the range of control modes can be made wide. Further effects and advantages of the check valve 713 will become apparent from the description of embodiments which will be mentioned below.

Figure 9:
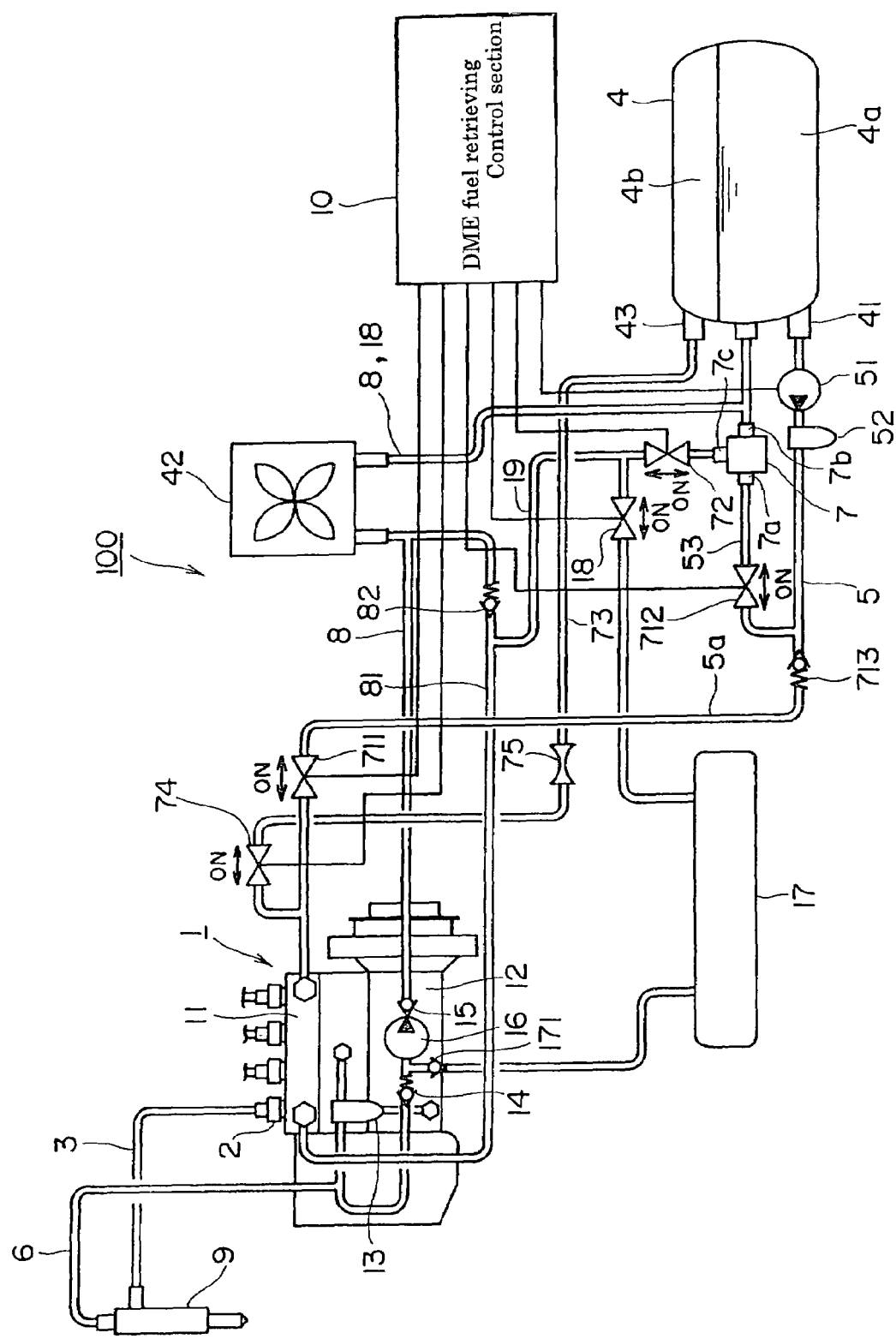
FIG. 9 is a schematic diagram showing a fifth embodiment of the DME fuel supply device according to the invention.

FIG. 9 is a schematic diagram showing a fifth embodiment of the DME fuel supply device according to the invention.

The DME fuel supply device 100 for supplying DME fuel to a diesel engine includes an injection pump 1. The injection pump 1 has the same number of injection pump elements 2 as the number of cylinders which the diesel engine has. The feed pump 51 pressurizes DME fuel reserved in the fuel tank 4 to a predetermined pressure and delivers the DME fuel into the feed pipe 5. The DME fuel delivery port 41 of the fuel tank 4 is provided below the level of the liquid phase 4a in the fuel tank 4, and the feed pump 51 is disposed in the vicinity of the DME fuel delivery port 41 of the fuel tank 4. The DME fuel delivered into the feed pipe 5 is filtered by the filter 52, and is delivered to the injection pump 1 via the check valve 713 and the feed pipe opening/closing solenoid valve 711. During an injection state (during the operation of the diesel engine), the feed pipe opening/closing solenoid valve 711 is ON in an opened state, and the feed pipe 5 is in its communicating state. The check valve 713 prevents DME fuel from flowing back from the injection pump 1 to the fuel tank 4.

The cam chamber 12 in the injection pump 1 is a dedicated lubricating system separated from a lubricating system for the diesel engine, and the oil separator 13 separates DME fuel and a lubricating oil from the lubricating oil in the cam chamber 12 that is mixed with DME fuel which has leaked into the cam chamber 12 in the injection pump 1, and returns the lubricating oil to the cam chamber 12. The DME fuel separated by the oil separator 13 is delivered to the compressor 16 via the check valve (nonreturn valve) 14 which prevents the pressure inside the cam chamber 12 from becoming not higher than atmospheric pressure, and the DME fuel, after having been pressurized by the compressor 16, is returned to the fuel tank 4 via the check valve (nonreturn valve) 15 and the cooler 42. The check valve 15 is provided for preventing DME fuel from flowing back to the cam chamber 12 from the fuel tank 4 during the stop of the diesel engine. The compressor 16 is a compressor which uses the cam in the cam chamber 12 as its driving force source. Accordingly, a more power-saving DME fuel supply device 100 can be realized.

The DME fuel which has been pressurized to the predetermined pressure by the feed pump 51 and delivered from the fuel tank 4 is delivered under pressure by a predetermined amount at predetermined timing from each of the injection pump elements 2 of the injection pump 1 to the fuel injection nozzle 9 disposed in each of the cylinders of the diesel engine via the injection pipe 3. The overflow fuel pipe 81 is provided with the overflow valve 82 which maintains the pressure of DME fuel in the fuel gallery 11 at a predetermined pressure and regulates the flowing direction of DME fuel in only the direction in which overflowed DME fuel is allowed to return to the fuel tank 4. The DME fuel which has overflowed from the injection pump 1 passes through the overflow fuel pipe 81 and is returned to the fuel tank 4 via the overflow valve 82 and the cooler 42. The DME fuel which has overflowed from each of the fuel injection nozzles 9 is returned to the fuel tank 4 via the nozzle return pipe 6, the overflow return pipe 8, and the cooler 42.

The DME fuel supply device 100 also has the "remaining fuel retrieving means" for retrieving to the fuel tank 4 the DME fuel remaining in the fuel gallery 11 in the injection pump 1 as well as in the overflow fuel pipe 81 (hereinafter referred to also as the injection system) during the stop of the diesel engine. The "remaining fuel retrieving means" has the aspirator 7, the fuel circulation pipe 53, the fuel circulation pipe opening/closing solenoid valve 712, the feed pipe opening/closing solenoid valve 711, the suction port opening/closing solenoid valve 72, and the DME fuel retrieving control section 10.

The aspirator 7 has the inlet 7a, the outlet 7b and the suction port 7c. The inlet 7a and the outlet 7b straightforwardly communicate with each other, and the suction port 7c is branched in an approximately perpendicular direction from the communication passage between the inlet 7a and the outlet 7b. When DME fuel flows from the inlet 7a to the outlet 7b, suction force is produced in the suction port 7c. FIG. 9 shows the vertical positional relationship between constituent elements (as in the following drawings), and the aspirator 7 is disposed at a position lower than the overflow fuel pipe 81. The fuel circulation pipe 53 is branched from the feed pipe 5 of the vicinity of a delivery port of the feed pump 51, and is connected to the fuel tank 4 via the inlet 7a and the outlet 7b of the aspirator 7. The fuel circulation pipe opening/closing solenoid valve 712 opens and closes the inlet 7a of the aspirator 7 of the fuel circulation pipe 53. The feed pipe opening/closing solenoid valve 711 opens and closes the communication of the feed pipe 5 on the same side as the injection pump 1 with respect to the branch point between the feed pipe 5 and the fuel circulation pipe 53. The suction port opening/closing solenoid valve 72 opens and closes the purge pipe 19 between the suction port 7c of the aspirator 7 and the fuel gallery 11 as well as the overflow fuel pipe 81.

The DME fuel retrieving control section 10 detects the operating/stopped state of the diesel engine (the injection/non-injection state of the DME fuel supply device 100), and executes opening/closing control (ON/OFF control) on the feed pump 51, the feed pipe opening/closing solenoid valve 711, the fuel circulation pipe opening/closing solenoid valve 712, and the suction port opening/closing solenoid valve 72 according to each of the states. During the stop of the diesel engine, the DME fuel retrieving control section 10 executes control to retrieve the DME fuel remaining in the fuel gallery 11 and the overflow fuel pipe 81.

Furthermore, the "remaining fuel retrieving means" also has the vapor-phase pressure delivery pipe 73 and the vapor-phase pressure delivery pipe opening/closing solenoid valve 74 for opening and closing the communication of the vapor-phase pressure delivery pipe 73, as means for connecting the outlet for the vapor phase 4b in the fuel tank 4 (the vapor-phase delivery port 43) and the inlet side of the fuel gallery 11 of the injection pump 1. The vapor-phase pressure delivery pipe 73 has the throttling section 75 whose inside diameter is partially reduced, and the vapor-phase pressure delivery pipe opening/closing solenoid valve 74 is disposed at a position higher than the fuel gallery 11 of the injection pump 1. The vapor-phase pressure delivery pipe opening/closing solenoid valve 74 is ON/OFF controlled by the DME fuel retrieving control section 10 so that the communication of the vapor-phase pressure delivery pipe 73 is opened when the vapor-phase pressure delivery pipe opening/closing solenoid valve 74 is in the ON control state.

The DME fuel supply device 100 further has the low-pressure tank 17 having a hermetically sealed structure smaller in capacity than the fuel tank 4. The low-pressure tank 17 is constructed so that its internal pressure is brought to a low-pressure state when the low-pressure tank 17 is sucked by the compressor 16, and so that the low-pressure state is maintained by the check valve 171 even when the compressor 16 stops. The low-pressure tank 17 communicates with the overflow fuel pipe 81 upstream of the overflow valve 82 through the purge pipe 19, and the purge pipe 19 is provided with the purge pipe opening/closing solenoid valve 18 capable of opening and closing the purge pipe 19. The purge pipe opening/closing solenoid valve 18 is controlled by the DME fuel retrieving control section 10, and during the stop of the diesel engine, the purge pipe opening/closing solenoid valve 18 is turned on and brought to its open state so that the low-pressure tank 17 and the overflow fuel pipe 81 communicate with each other, while during the operation of the diesel engine, the purge pipe opening/closing solenoid valve 18 is turned off and brought to its closed state so that the communication between the low-pressure tank 17 and the overflow fuel pipe 81 is cut off.

Next, the states of control of each of the feed pump 51, feed pipe opening/closing solenoid valve 711, the fuel circulation pipe opening/closing solenoid valve 712, and the suction port opening/closing solenoid valve 72 by the DME fuel retrieving control section 10 in the DME fuel supply device 100 during stop, fuel charging, engine operation and retrieving of remaining fuel will be described with reference to the corresponding drawings.

Figure 10:
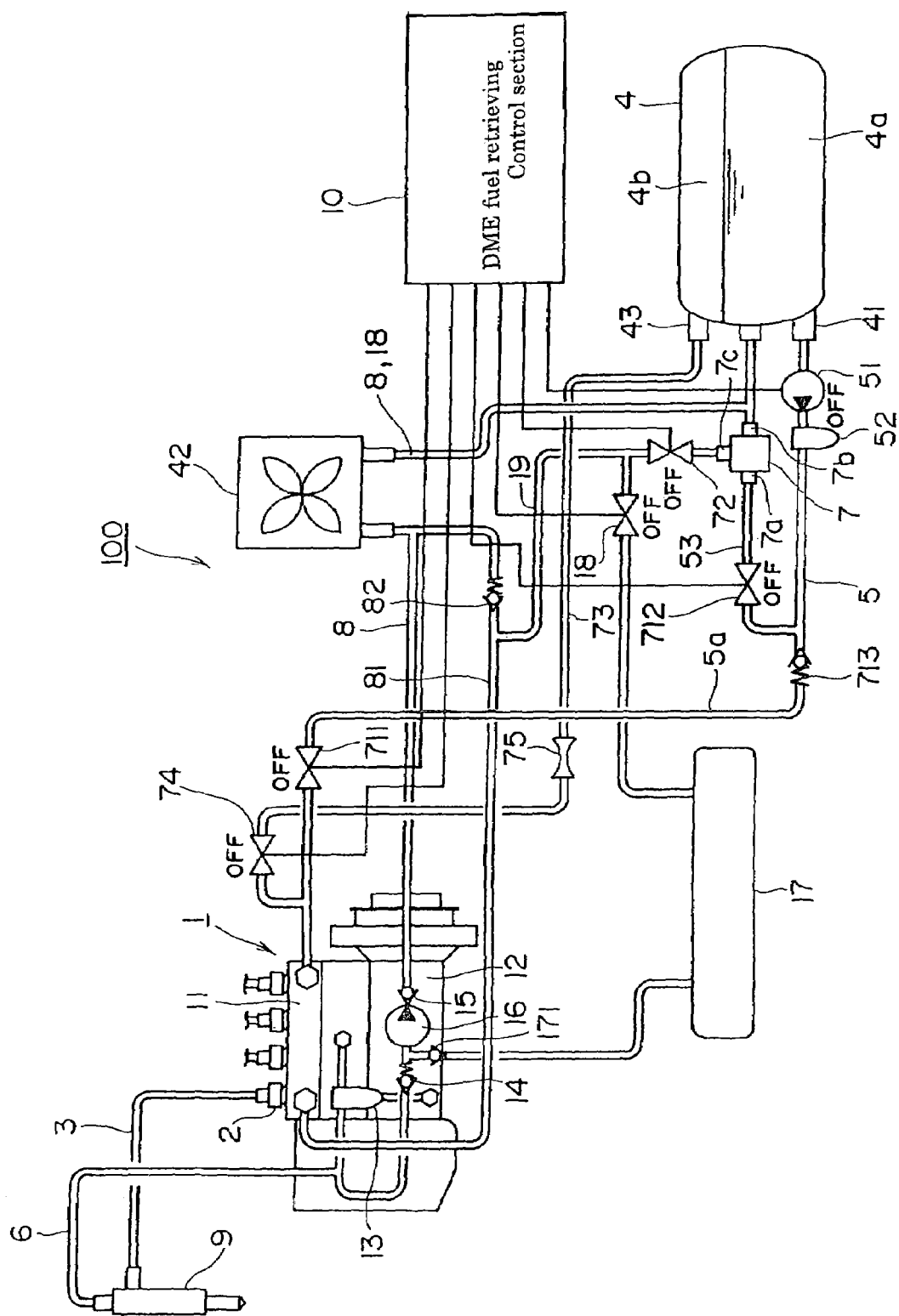
FIG. 10 is a schematic diagram showing the stopped state of the DME fuel supply device according to the fifth embodiment of the invention.

FIG. 10 is a schematic diagram showing the stopped state of the DME fuel supply device 100 according to the invention of the present application.

During stop, the DME fuel retrieving control section 10 executes OFF control on all of the feed pump 51, the feed pipe opening/closing solenoid valve 711, the fuel circulation pipe opening/closing solenoid valve 712, the suction port opening/closing solenoid valve 72, the vapor-phase pressure delivery pipe opening/closing solenoid valve 74, and the purge pipe opening/closing solenoid valve 18. During the OFF control, the feed pump 51 is stopped, and all of the feed pipe opening/closing solenoid valve 711, the fuel circulation pipe opening/closing solenoid valve 712, the suction port opening/closing solenoid valve 72, the vapor-phase pressure delivery pipe opening/closing solenoid valve 74 and the purge pipe opening/closing solenoid valve 18 are closed.

The feed pipe 5 is charged with DME fuel from the DME fuel delivery port 41 of the fuel tank 4 to the check valve 713, and further, a section (reference numeral 5a) between the check valve 713 and the closed feed pipe opening/closing solenoid valve 711 is held in the state of being charged with DME fuel.

Figure 11:
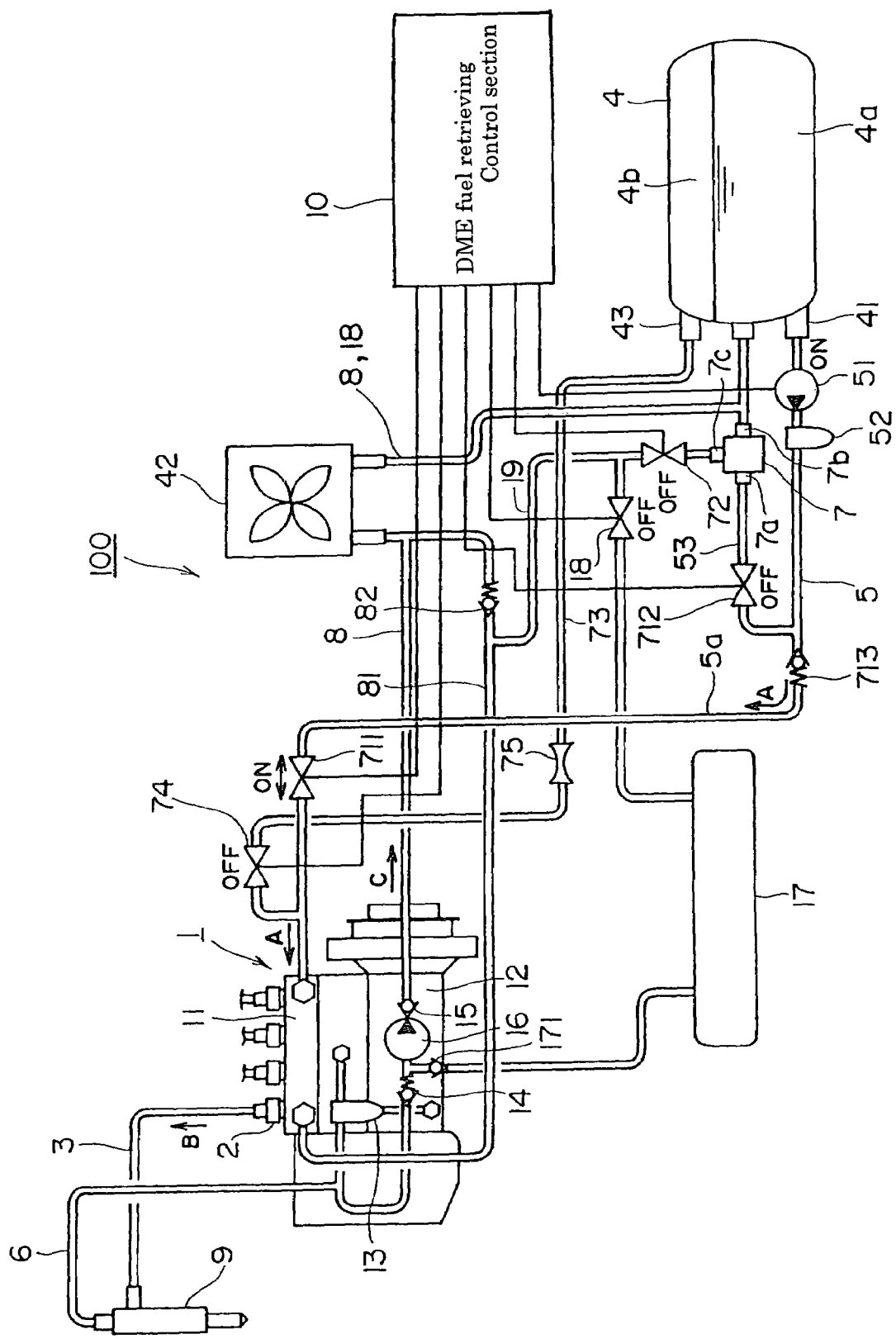
FIG. 11 is a schematic diagram showing the state of the DME fuel supply device according to the fifth embodiment of the invention during fuel charging as well as during operation.

FIG. 11 is a schematic diagram showing the state of the DME fuel supply device 100 according to the invention of the present application during fuel charging as well as during operation.

During the fuel charging of charging DME fuel into the injection system such as the fuel gallery 11 from the stopped state, the DME fuel retrieving control section 10 executes ON control on the feed pipe opening/closing solenoid valve 711, and then executes ON control on the feed pump 51. When the feed pipe opening/closing solenoid valve 711 is ON controlled, the communication passage of the feed pipe 5 from the feed pump 51 to the injection pump 1 is formed, and the DME fuel of the fuel tank 4 is delivered under pressure to the fuel gallery 11 by the feed pump 51 (symbol A). As described above, the feed pipe 5 is held in the state of being already charged with DME fuel during stop from the DME fuel delivery port 41 of the fuel tank 4 to the feed pipe opening/closing solenoid valve 711, so that when the DME fuel of the fuel tank 4 starts to be charged into the injection system such as the fuel gallery 11 during stop, the DME fuel immediately starts to be charged into the fuel gallery 11 of the injection pump 1. Accordingly, it is possible to reduce time taken to charge the DME fuel into the injection system during fuel charging.

When the DME fuel is charged into the fuel gallery 11, the injection pipe 3 and the overflow fuel pipe 81 (symbol B), the diesel engine is brought to the operable state. When the diesel engine in this state is started and reaches the operating state, the cam in the cam chamber 12 of the injection pump 1 rotates in conjunction with the operation of the diesel engine, thereby operating the compressor 16. As described above, DME fuel which has entered the cam chamber 12 is separated by the oil separator 13 and is then returned to the fuel tank 4 by being sucked by the compressor 16 (symbol C). The inside of the low-pressure tank 17 is also sucked by the compressor 16 and maintained in the low-pressure state.

Figure 12:
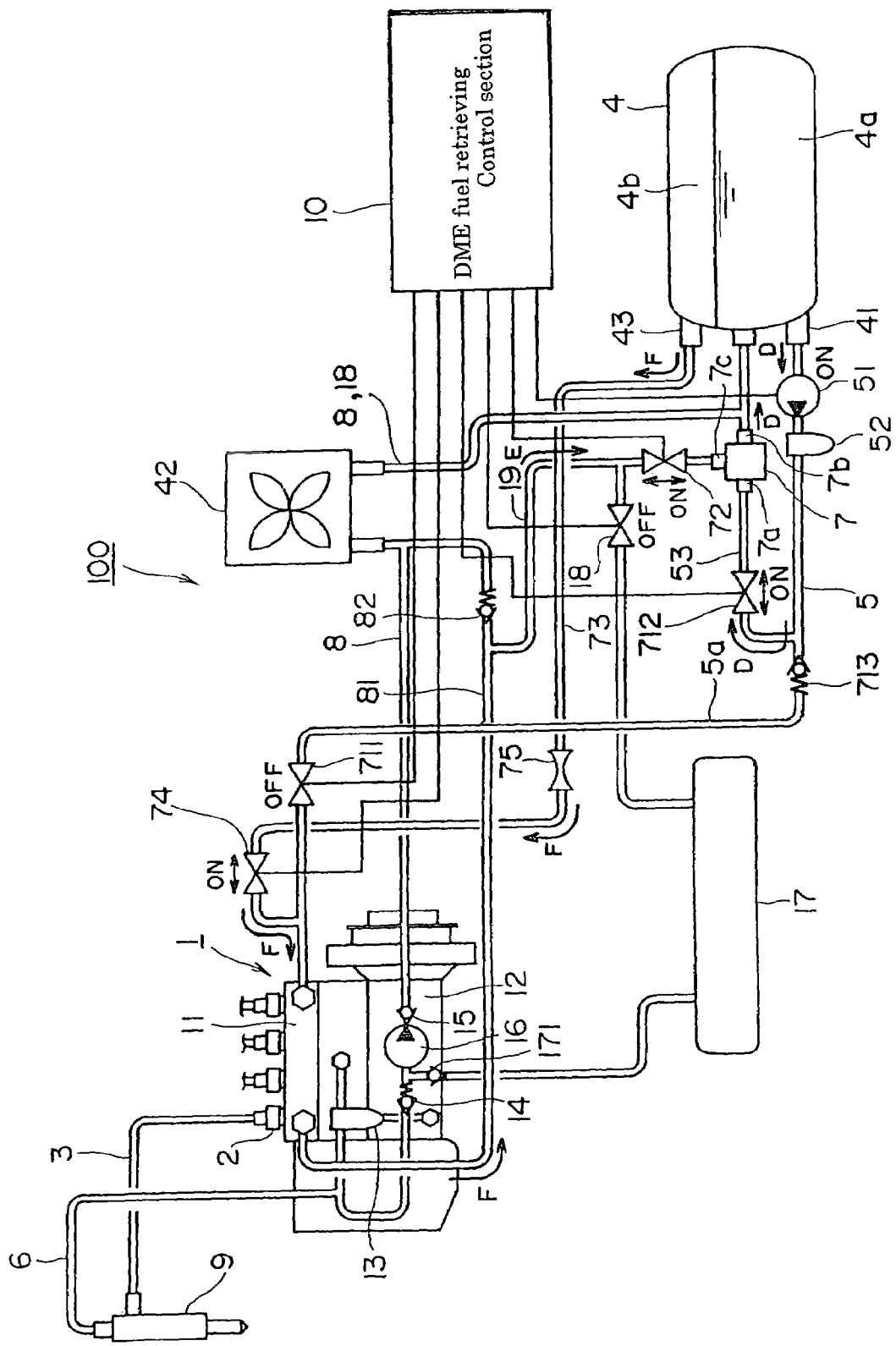
FIG. 12 is a schematic diagram showing the state of the DME fuel supply device according to the fifth embodiment of the invention during the retrieving of remaining fuel, and shows the state in which DME fuel is being retrieved by the aspirator (vapor-phase substitution)

FIG. 12 is a schematic diagram showing the state of the DME fuel supply device 100 according to the invention of the present application during the retrieving of remaining fuel, and shows the state in which DME fuel is being retrieved by the aspirator 7 (vapor-phase substitution).

After the diesel engine has been stopped, in order to retrieve to the fuel tank 4 the DME fuel remaining in the fuel gallery 11, the injection pipe 3 and the overflow fuel pipe 81, the DME fuel retrieving control section 10 executes OFF control on the feed pipe opening/closing solenoid valve 711 to cut off the communication passage of the feed pipe 5 on the same side as the injection pump 1 with respect to the branch point between he feed pipe 5 and the fuel circulation pipe 53, thereby cutting off the supply of DME fuel to the fuel gallery 11. When the DME fuel retrieving control section 10 executes ON control to open the fuel circulation pipe opening/closing solenoid valve 712, the DME fuel delivered from the feed pump 51 is delivered not to the injection pump 1 but to the fuel circulation pipe 53, and is circulated from the fuel circulation pipe 53 to the fuel tank 4 via the aspirator 7 (symbol D).

A ring-shaped flow of DME fuel including the aspirator 7 is formed, and suction force is produced in the suction port 7c of the aspirator 7. During this state, when the suction port opening/closing solenoid valve 72 is controlled to open to provide communication between the suction port 7c of the aspirator 7 and the fuel gallery 11, the injection pipe 3 as well as the overflow fuel pipe 81, the DME fuel remaining in the fuel gallery 11, the injection pipe 3 and the overflow fuel pipe 81 can be sucked from the suction port 7c of the aspirator 7. The DME fuel sucked from the suction port 7c of the aspirator 7 is vaporized, i.e., substituted by a vapor phase, and sucked from the suction port 7c, by the suction force produced in the suction port 7c, and is retrieved to the fuel tank 4 together with DME fuel which flows from the inlet 7a to the outlet 7b of the aspirator 7 (symbol E).

In this manner, the fuel circulation pipe 53 is branched from the feed pipe 5 in the vicinity of the discharging port of the feed pump 51, and is connected to the fuel tank 4 via the inlet 7a and the outlet 7b of the aspirator 7, whereby the length of the circulation passage of DME fuel including the aspirator 7 can be made short, and the flow passage resistance of the circulation passage can be made small. Accordingly, a decrease due to the flow passage resistance in the flow rate of DME fuel flowing in the circulation passage can be reduced, and a decrease in the suction force produced in the suction port 7c of the aspirator 7 can be reduced, whereby it is possible to improve the efficiency of retrieving of remaining fuel by the aspirator 7.

In addition, the fuel circulation pipe opening/closing solenoid valve 712 and the feed pipe opening/closing solenoid valve 711 are constructed to be independently openable and closable, whereby after the DME fuel remaining in the fuel gallery 11, the injection pipe 3 and the overflow fuel pipe 81 has been retrieved by the aspirator 7, if the fuel circulation pipe opening/closing solenoid valve 712 is closed with the feed pipe opening/closing solenoid valve 711 remaining closed and the feed pump 51 is stopped and the DME fuel supply device 100 is stopped, DME fuel can be held in the state of being charged between the feed pipe opening/closing solenoid valve 711 and the check valve 713. Accordingly, it is possible to reduce the amount of DME fuel to be retrieved by the "remaining fuel retrieving means", and it is possible to reduce time taken to retrieve DME fuel through the "remaining fuel retrieving means".

Furthermore, it is more preferable to dispose the aspirator 7 and the fuel circulation pipe opening/closing solenoid valve 712 immediately close to the fuel tank 4 so as to make the length of the fuel circulation pipe 53 as short as possible. In this construction, since the flow passage resistance of the fuel circulation pipe 53 can be minimized, the efficiency of retrieving of remaining fuel by the aspirator 7 can be improved to a further extent.

Furthermore, it is more preferable that the feed pipe opening/closing solenoid valve 711 be disposed as close as possible to the inlet of the fuel gallery 11 of the injection pump 1, and the check valve 713 be disposed as immediately close as possible to the branch point between the feed pipe 5 and the fuel circulation pipe 53. In this construction, since the amount of DME fuel to be held in the feed pipe 5 when the feed pipe opening/closing solenoid valve 711 is closed can be made far larger, it is possible to further reduce time taken to charge DME fuel into the injection system at the starting time of the diesel engine. In addition, since the amount of DME fuel remaining in the injection system, which is to be retrieved after the stop of the diesel engine, can be made far smaller, it is possible to further reduce time taken to retrieve DME fuel remaining in the injection system after the stop of the diesel engine.

At the same time that the DME fuel of the fuel gallery 11 and the overflow fuel pipe 81 is retrieved to the fuel tank 4 by being sucked by the aspirator, the DME fuel retrieving control section 10 also executes ON control to open the vapor-phase pressure delivery pipe opening/closing solenoid valve 74 and brings the vapor-phase pressure delivery pipe 73 which connects the vapor phase 4b of the fuel tank 4 and the inlet of the fuel gallery 11, into a communicating state. The DME fuel in a liquid state remaining in the fuel gallery 11 and the overflow fuel pipe 81 is delivered under pressure to the suction port 7c of the aspirator 7 by the high pressure of the vapor phase 4b (symbol F). In addition, this pressure is compressed to a far higher pressure by the throttling section 75 where the inside diameter of the vapor-phase pressure delivery pipe 73 is partially reduced, whereby the remaining DME fuel can be delivered under pressure by a far higher pressure.

Accordingly, since the DME fuel in a liquid state is delivered under pressure to the suction port 7c of the aspirator 7 by using the pressure of the vapor phase 4b, it is possible to reduce time taken to retrieve the DME fuel remaining in the fuel gallery 11 and the overflow fuel pipe 81. The DME fuel retrieving control section 10, after the lapse of a predetermined time, closes only the vapor-phase pressure delivery pipe opening/closing solenoid valve 74 and cuts off the communication with the vapor phase 4b in a high-pressure state. Accordingly, since the inside of the fuel gallery 11 and that of the overflow fuel pipe 81 can be brought into lower-pressure states, the vaporization of the DME fuel in a liquid state which remains without being delivered under pressure by vapor phase pressure can be accelerated, whereby it is possible to further reduce time taken to retrieve the remaining DME fuel by the "remaining fuel retrieving means".

In addition, in the DME fuel supply device 100, since the aspirator 7 is disposed at a position lower than the fuel gallery 11, the injection pipe 3 and the overflow fuel pipe 81, the DME fuel remaining in the fuel gallery 11, the injection pipe 3 and the overflow fuel pipe 81 is retrieved to the fuel tank 4 by a combined force of gravity and the suction force produced in the suction port 7c of the aspirator 7. Accordingly, it is possible to more efficiently retrieve the DME fuel remaining in the injection system by using gravity, and it is possible to further reduce time taken to retrieve the DME fuel in the injection system to the fuel tank 4 after the stop of the diesel engine.

In addition, since the vapor-phase pressure delivery pipe opening/closing solenoid valve 74 is disposed at a position higher than the fuel gallery 11, the DME fuel in a liquid state remaining in the fuel gallery 11, the injection pipe 3 and the overflow fuel pipe 81 is forcedly delivered under pressure to the suction port 7c of the aspirator 7 by a combined force of gravity and the pressure of the vapor phase 4b in the fuel tank 4. Accordingly, gravity can be used to more efficiently deliver under pressure the DME fuel in a liquid state remaining in the fuel gallery 11, the injection pipe 3 and the overflow fuel pipe 81 to the suction port 7c of the aspirator 7, whereby it is possible to further reduce time taken to retrieve the DME fuel remaining in the fuel gallery 11, the injection pipe 3 and the overflow fuel pipe 81 to the fuel tank 4.

Figure 13:
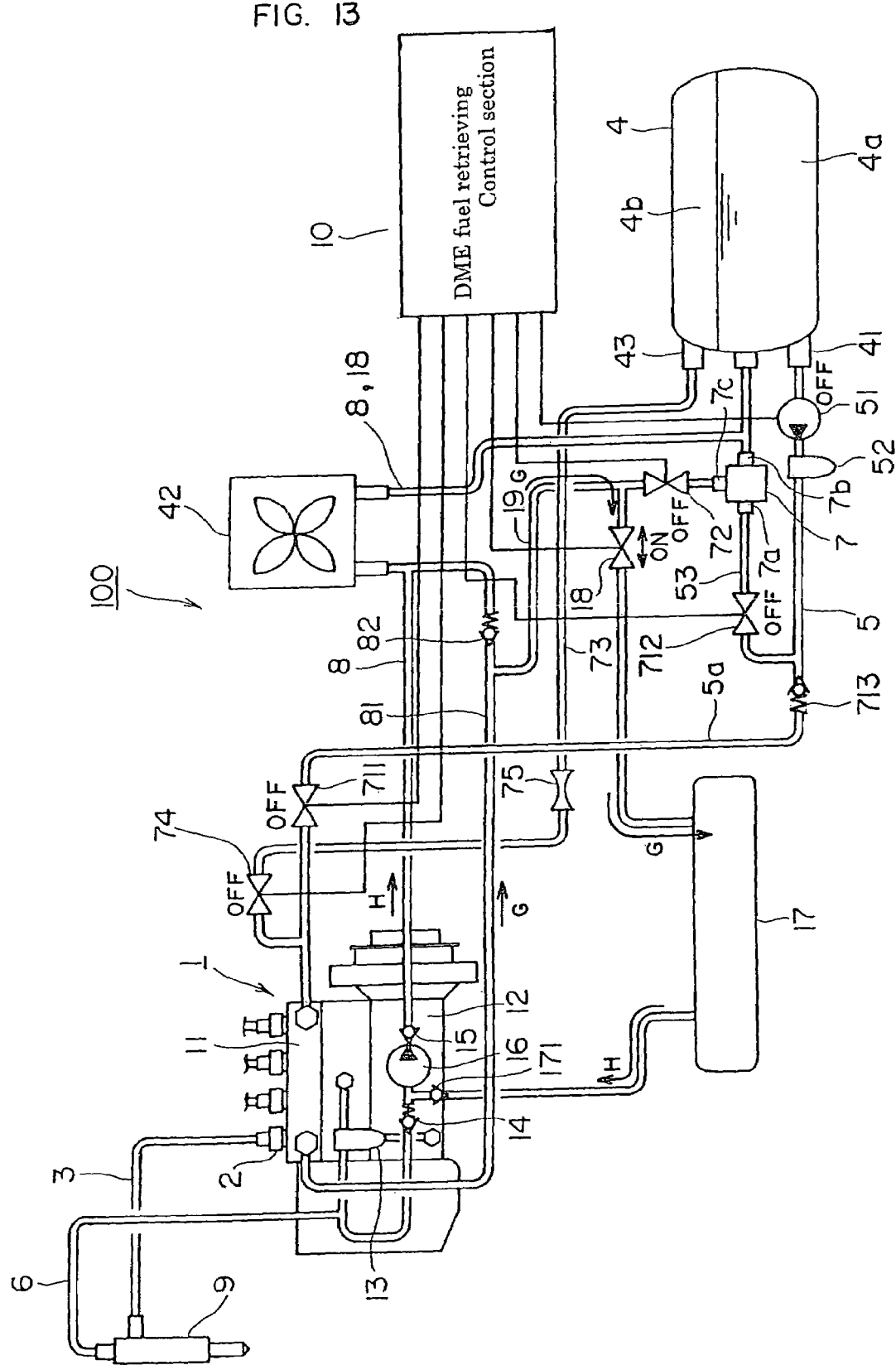
FIG. 13 is a schematic diagram showing the state of the DME fuel supply device according to the fifth embodiment of the invention during the retrieving of remaining fuel, and shows the state in which DME fuel is being sucked into the low-pressure tank.

FIG. 13 is a schematic diagram showing the state of the DME fuel supply device 100 according to the invention of the present application during the retrieving of remaining fuel, and shows the state in which DME fuel is being sucked into the low-pressure tank 17.

After the DME fuel retrieving control section 10 has retrieved the DME fuel remaining in the fuel gallery 11, the injection pipe 3 and the overflow fuel pipe 81, by means of the aspirator 7 for a predetermined time, the DME fuel retrieving control section 10 executes OFF control to stop the feed pump 51, and executes OFF control on the vapor-phase pressure delivery pipe opening/closing solenoid valve 74 to cut off the communication between the vapor phase 4b of the fuel tank 4 and the inlet of the fuel gallery 11. Then, the DME fuel retrieving control section 10 executes OFF control on the fuel circulation pipe opening/closing solenoid valve 712 to cut off the circulation passage of the fuel circulation pipe 53, and executes OFF control to close the suction port opening/closing solenoid valve 72 and cut off the communication between the overflow fuel pipe 81 and the suction port 7c of the aspirator 7. Then, the DME fuel retrieving control section 10 executes ON control to open the purge pipe opening/closing solenoid valve 18 and provide communication between the low-pressure tank 17 maintained in an approximately constant low pressure state and the purge pipe 19. The residual DME fuel remaining in the fuel gallery 11, the injection pipe 3 and the overflow fuel pipe 81 is sucked into the low-pressure tank 17 by the negative pressure in the low-pressure tank 17 via the purge pipe 19 (symbol G). When the diesel engine again starts and the compressor 16 is activated, the DME fuel sucked into the low-pressure tank 17 is sucked by the compressor 16 and is retrieved to the fuel tank 4 (symbol H).

Accordingly, since the purge pipe opening/closing solenoid valve 18 is turned on after the DME fuel remaining in the fuel gallery 11 and the overflow fuel pipe 81 has been retrieved to some extent by the aspirator 7, the DME fuel remaining without being completely retrieved by the aspirator 7 can be rapidly sucked and retrieved into the low-pressure tank 17. Accordingly, it is possible to further reduce time taken to retrieve DME fuel by the "remaining fuel retrieving means".

In this manner, it is possible to reduce time taken to retrieve the DME fuel in the injection system to the fuel tank 4 after the stop of the diesel engine. It is also possible to reduce time taken to charge DME fuel into the injection system from the fuel tank 4 at the starting time of the diesel engine.

As another embodiment, there is provided the DME fuel supply device 100 for a common rail diesel engine in which a common rail is provided between the injection pump 1 and the injection nozzle 9 in the above-mentioned fourth embodiment.

Figure 14:
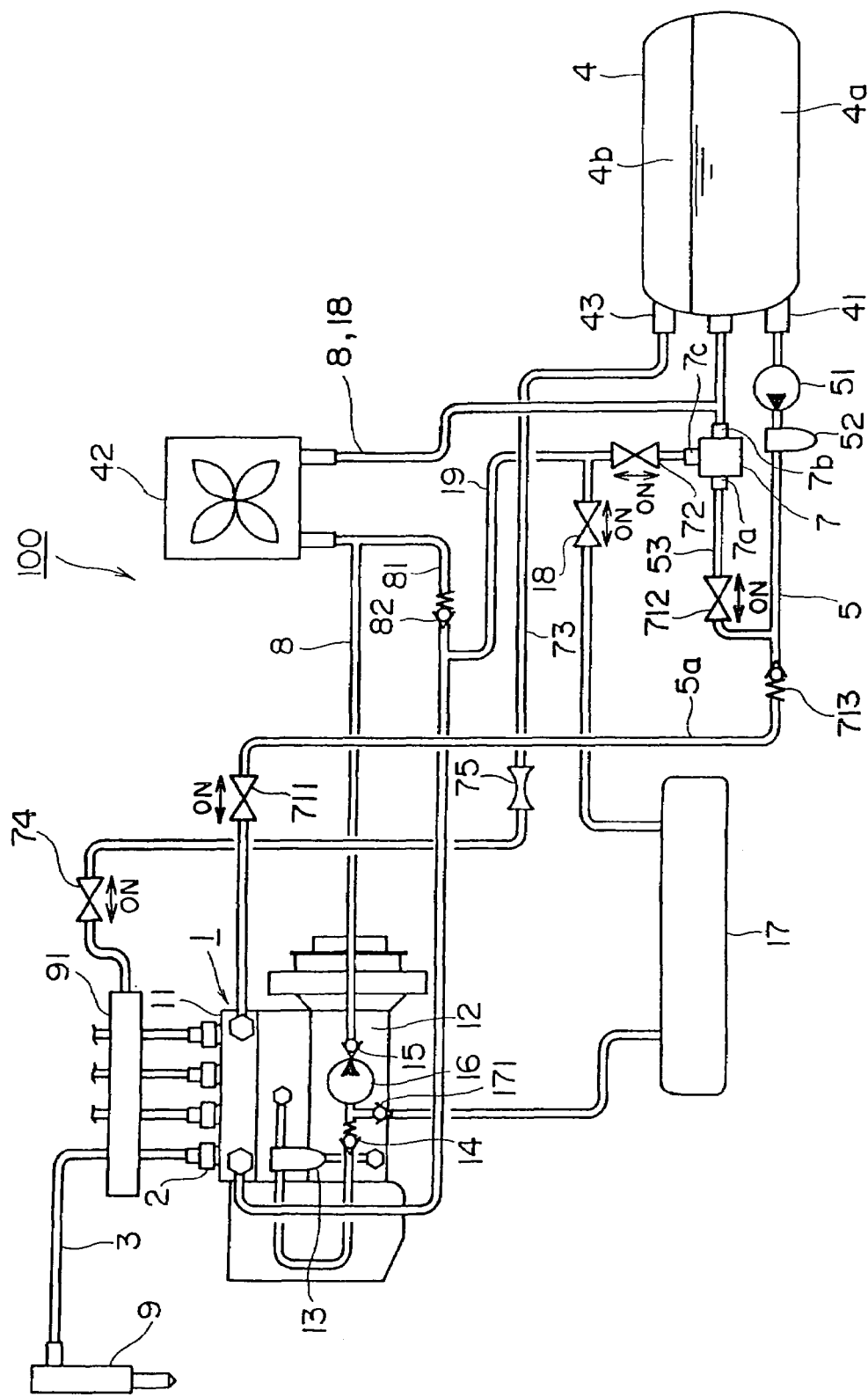
FIG. 14 is a schematic diagram showing a sixth embodiment of the DME fuel supply device according to the invention, and shows a DME fuel supply device for a common rail diesel engine in which the vapor-phase pressure delivery pipe is connected to a common rail.
Figure 15:
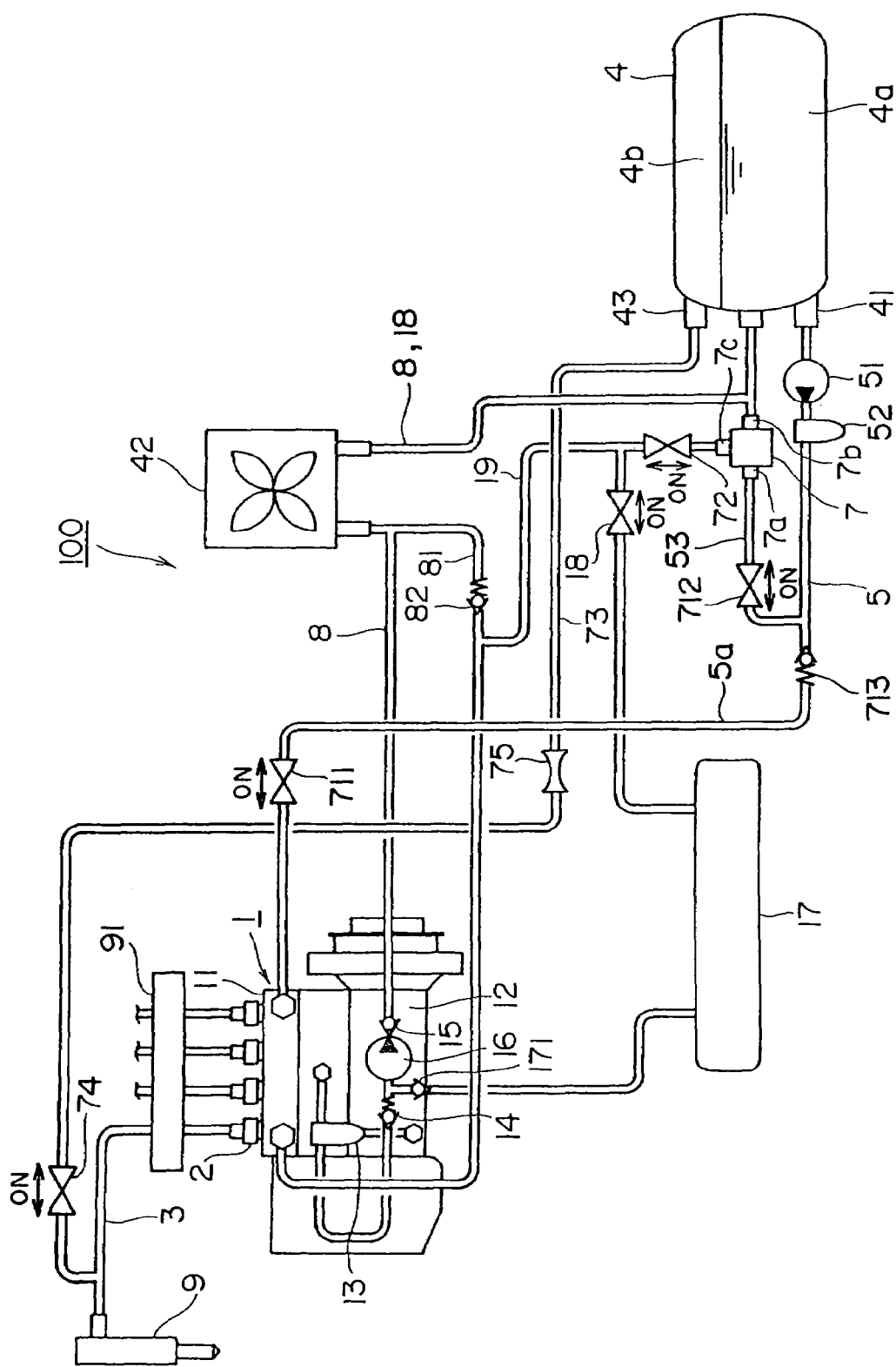
FIG. 15 is a schematic diagram showing a seventh embodiment of the DME fuel supply device according to the invention, and shows a DME fuel supply device for a common rail diesel engine in which the vapor-phase pressure delivery pipe is connected to the injection pipe.

FIG. 14 is a schematic diagram showing a sixth embodiment of the DME fuel supply device 100 according to the invention of the present application, and shows the DME fuel supply device 100 for a common rail diesel engine in which the vapor-phase pressure delivery pipe 73 is connected to a common rail. FIG. 15 is a schematic diagram showing a seventh embodiment of the DME fuel supply device 100 according to the invention of the present application, and shows the DME fuel supply device 100 for a common rail diesel engine in which the vapor-phase pressure delivery pipe 73 is connected to the injection pipe 3.

In the above-mentioned fifth embodiment, the injection nozzle 9 is constructed to be opened for injection of DME fuel by the pressure of DME fuel delivered under pressure from the injection pump 1 to the injection pipe 3. For this reason, when the injection pipe 3 is connected to the vapor-phase pressure delivery pipe 73, there is a possibility that the pressure in the injection pipe 3 becomes unstable, and there is a risk that the fuel injection characteristics of the injection nozzle 9 become unstable. Therefore, the vapor-phase pressure delivery pipe 73 cannot be connected to the injection pipe 3.

On the other hand, the DME fuel supply device 100 for a common rail diesel engine has a construction in which DME fuel is delivered under pressure from the injection pump 1 to the common rail 91 and the DME fuel in the common rail 91 maintained in a given high-pressure state is delivered to each injection nozzle 9. For this reason, the common rail diesel engine adopts the injection nozzle 9 having an electromagnetic type of valve opening mechanism. This injection nozzle 9 is not easily influenced by pressure variations in the injection pipe 3.

Accordingly, in the DME fuel supply device 100 for a common rail diesel engine, as shown in FIG. 6, the vapor-phase pressure delivery pipe 73 can be connected to the common rail 91 (embodiment 6). Accordingly, while the DME fuel remaining in the common rail 91, the fuel gallery 11 and the overflow fuel pipe 81 is being retrieved to the fuel tank 4 by the above-mentioned "remaining fuel retrieving means", the DME fuel in a liquid state remaining in the common rail 91 can be forcedly delivered under pressure to the aspirator 7 by the pressure of the vapor phase 4b in the fuel tank 4. Accordingly, it is possible to further reduce time taken to retrieve the DME fuel remaining in the common rail 91 to the fuel tank 4 by means of the aspirator 7. In addition, since the vapor-phase pressure delivery pipe opening/closing solenoid valve 74 which opens and closes the vapor-phase pressure delivery pipe 73 is disposed at a position higher than the common rail 91, the DME fuel in a liquid state remaining in the common rail 91 can be more efficiently forcedly delivered under pressure to the aspirator 7 by a combined force of gravity and vapor phase pressure. As to the sixth embodiment (FIG. 14) and the seventh embodiment (FIG. 15), the description of sections which have the same constructions as the corresponding ones of the first embodiment is omitted herein.

Furthermore, in the DME fuel supply device 100 for a common rail diesel engine, as shown in FIG. 15, the vapor-phase pressure delivery pipe 73 may also be connected to the vicinity of the injection nozzle 9 of the injection pipe 3 (the inlet side of the injection nozzle 9) (embodiment 7). If the vapor-phase pressure delivery pipe 73 is connected in this manner to the vicinity of the injection nozzle 9 of the injection pipe 3 disposed at a position far higher than the common rail 91, not only the DME fuel remaining in the common rail 91 but also the DME fuel remaining in the injection pipe 3 can be delivered under pressure directly to the aspirator 7 by vapor phase pressure. Accordingly, it is possible to further reduce time taken to retrieve the DME fuel remaining in the common rail 91 and the injection pipe 3 to the fuel tank 4 by means of the aspirator 7. In addition, since the vapor-phase pressure delivery pipe opening/closing solenoid valve 74 which opens and closes the vapor-phase pressure delivery pipe 73 is disposed at a position higher than the injection pipe 3, the DME fuel in a liquid state remaining in the injection pipe 3 can be more efficiently forcedly delivered under pressure to the aspirator 7 by a combined force of gravity and vapor phase pressure.

It goes without saying that the invention is not limited to any of the above-mentioned embodiments, and various modifications can be made without departing from the scope of the invention described in the appended claims and are included in the scope of the invention.

According to the invention, in a liquefied gas fuel supply device for a diesel engine, it is possible to reduce time taken to retrieve liquefied gas fuel in an injection system to a fuel tank after the stop of the diesel engine.

In addition, in the liquefied gas fuel supply device for the diesel engine, it is possible to reduce time taken to charge liquefied gas fuel in the injection system to the fuel tank at the starting time of the diesel engine.

INDUSTRIAL APPLICABILITY

The invention can be applied to liquefied gas supply devices for diesel engines which use liquefied gases such as DME or high cetane number LP gases as their fuels.

The invention claimed is:

1. A liquefied gas fuel supply device for a diesel engine characterized by comprising:
a fuel tank for reserving liquefied gas fuel;
an injection pump for delivering liquefied gas fuel to a fuel injection nozzle of a diesel engine;
fuel supply means for delivering the liquefied gas fuel from the fuel tank to the injection pump; and
remaining fuel retrieving means for retrieving liquefied gas fuel remaining in the injection pump to the fuel tank, after the stop of the diesel engine,
the remaining fuel retrieving means being constructed to cause forced circulation of the liquefied gas fuel in the fuel tank back so as to again return the liquefied gas fuel to the fuel tank through an aspirator, and retrieve the liquefied gas fuel remaining in the injection pump to the fuel tank by suction force produced in a suction port of the aspirator by the forced circulation,
the suction port of the aspirator being disposed at a position lower than an area in the injection pump in which the liquefied gas fuel remains.

2. A liquefied gas fuel supply device for a diesel engine characterized by comprising:
a feed pump for pressurizing liquefied gas fuel in a fuel tank to a predetermined pressure and delivering the liquefied gas fuel to a feed pipe;
an injection pump for delivering the liquefied gas fuel in a fuel gallery into which the liquefied gas fuel delivered via the feed pipe flows, to an injection nozzle of a diesel engine by a predetermined amount at predetermined timing;
an overflow fuel pipe for returning to the fuel tank the liquefied gas fuel which overflows from the injection pump; and
remaining fuel retrieving means for retrieving to the fuel tank the liquefied gas fuel remaining in the fuel gallery and the overflow fuel pipe, after the stop of the diesel engine, the remaining fuel retrieving means having:
a fuel circulation pipe branched from the feed pipe at an intermediate point thereof and connected to the fuel tank;
feed pipe opening/closing means provided in the feed pipe on a side downstream of the feed pump in a flowing direction of the liquefied gas fuel, and operative to open and close a flow passage of the feed pipe; and
an aspirator provided in the fuel circulation pipe and having a suction port disposed to communicate with the fuel gallery and/or the overflow fuel pipe,
the remaining fuel retrieving means being constructed to circulate the liquefied gas fuel delivered from the feed pump, to the fuel tank via the feed pipe, the fuel circulation pipe and the aspirator in the state of cutting off supply to the injection pump by closing the feed pipe opening/closing means, and suck and retrieve the liquefied gas fuel remaining in the fuel gallery and the overflow fuel pipe, to the fuel tank by suction force produced in the suction port of the aspirator on the basis of the circulation,
the suction port of the aspirator being disposed at a position lower than the fuel gallery and the overflow fuel pipe.

3. A liquefied gas fuel supply device for a diesel engine according to claim 2, characterized by further comprising a check valve disposed between a position where the fuel circulation pipe is branched from the feed pipe and the feed pipe opening/closing means, and operative to prevent liquefied gas fuel from flowing back from the injection pump, and fuel circulation pipe opening/closing means provided in the fuel circulation pipe and operative to open and close a flow passage of the fuel circulation pipe.

4. A liquefied gas fuel supply device for a diesel engine characterized by comprising:
a feed pump for pressurizing liquefied gas fuel in a fuel tank to a predetermined pressure and delivering the liquefied gas fuel to a feed pipe;
an injection pump for delivering the liquefied gas fuel in a fuel gallery into which the liquefied gas fuel delivered via the feed pipe flows, to an injection nozzle of a diesel engine by a predetermined amount at predetermined timing;
an overflow fuel pipe for returning to the fuel tank the liquefied gas fuel which overflows from the injection pump; and
remaining fuel retrieving means for retrieving to the fuel tank the liquefied gas fuel remaining in the fuel gallery and the overflow fuel pipe, after the stop of the diesel engine,
the remaining fuel retrieving means having;
a fuel circulation pipe branched from the feed pipe at an intermediate point thereof and connected to the fuel tank;
feed pipe opening/closing means provided in the feed pipe on a side downstream of the feed pump in a flowing direction of the liquefied gas fuel, and operative to open and close a flow passage of the feed pipe; and
an aspirator provided in the fuel circulation pipe and having a suction port disposed to communicate with the fuel gallery and/or the overflow fuel pipe,
the remaining fuel retrieving means being constructed to circulate the liquefied gas fuel delivered from the feed pump, to the fuel tank via the feed pipe, the fuel circulation pipe and the aspirator in the state of cutting off supply to the injection pump by closing the feed pipe opening/closing means, and suck and retrieve the liquefied gas fuel remaining in the fuel gallery and the overflow fuel pipe, to the fuel tank by suction force produced in the suction port of the aspirator on the basis of the circulation,
the remaining fuel retrieving means further including:
fuel circulation pipe opening/closing means provided in the fuel circulation pipe and operative to open and close a flow passage of the fuel circulation pipe; and
a check valve disposed between a branch point between the feed pipe and the fuel circulation pipe and the feed pipe opening/closing means, and operative to prevent liquefied gas fuel from flowing back from the injection pump.

5. A liquefied gas fuel supply device for a diesel engine according to any one of claims 1 to 4, characterized by further comprising a vapor-phase pressure delivery pipe connecting an inlet for liquefied gas fuel in the injection pump and a vapor phase in the fuel tank, and vapor-phase pressure delivery pipe opening/closing means for opening and closing the vapor-phase pressure delivery pipe.

6. A liquefied gas fuel supply device for a diesel engine according to claim 5, characterized in that the vapor-phase pressure delivery pipe opening/closing means is disposed at a position higher than an area in the injection pump in which the liquefied gas fuel remains.

7. A liquefied gas fuel supply device for a diesel engine according to any one of claims 1 or 2, characterized by including a construction in which the liquefied gas fuel delivered from the injection pump is supplied to a common rail and is delivered to each fuel injection nozzle from the common rail, and further comprising a vapor-phase pressure delivery pipe connecting the common rail and a vapor phase in the fuel tank, and vapor-phase pressure delivery pipe opening/closing means for opening and closing the vapor-phase pressure delivery pipe.

8. A liquefied gas fuel supply device for a diesel engine according to claim 7, characterized in that the vapor-phase delivery pipe opening/closing means is disposed at a position higher than the common rail.

9. A liquefied gas fuel supply device for a diesel engine according to any one of claims 1 or 2, characterized by including a construction in which the liquefied gas fuel delivered from the injection pump is supplied to a common rail and is delivered to each fuel injection nozzle from the common rail, and further comprising a vapor-phase pressure delivery pipe connecting an inlet of the fuel injection nozzle and a vapor phase in the fuel tank, and vapor-phase pressure delivery pipe opening/closing means for opening and closing the vapor-phase pressure delivery pipe.

10. A liquefied gas fuel supply device for a diesel engine according to claim 9, characterized in that the vapor-phase pressure delivery pipe opening/closing means is disposed at a position higher than the fuel injection nozzle.

11. A liquefied gas fuel supply device for a diesel engine according to claim 2, characterized by further comprising: an oil separator for separating the liquefied gas fuel mixing with a lubricating oil in a cam chamber of the injection pump which is a dedicated lubricating system separated from a lubricating system for a diesel engine; a compressor for pressurizing the liquefied gas fuel separated by the oil separator and delivering the liquefied gas fuel to the fuel tank; a low-pressure tank connected to a suction port of the compressor; a purge pipe causing the low-pressure tank and the overflow fuel pipe to communicate with each other; and purge pipe opening/closing means capable of opening and closing the purge pipe.

12. A liquefied gas fuel supply device for a diesel engine according to claim 11 characterized in that a check valve for holding pressure in the low-pressure tank is disposed between the compressor and the low-pressure tank.

13. A liquefied gas fuel supply device for a diesel engine according to claim 11, characterized in that the remaining fuel retrieving means includes: the feed pipe opening/closing means and the fuel circulation pipe opening/closing means for switching a delivery port of the feed pipe to either one of an inlet of a circulation passage of the aspirator and an inlet of the fuel gallery and causing the delivery port to communicate with the either one; suction port opening/closing means for opening and closing communication between the suction port of the aspirator and the fuel gallery as well as the overflow fuel pipe; and a liquefied gas fuel retrieving control section capable of executing control to switch communication provided by each of the feed pipe opening/closing means and the fuel circulation pipe opening/closing means to the inlet of the aspirator, open the suction port opening/closing means, and form a flow passage through which the liquefied gas fuel delivered from the feed pump is to be circulated to the fuel tank, as well as control to open the vapor-phase pressure delivery pipe opening/closing means and, after the lapse of a predetermined time, close only the vapor-phase pressure delivery pipe opening/closing means.

14. A liquefied gas fuel supply device for a diesel engine according to claim 13, characterized in that the liquefied gas fuel retrieving control section is constructed to be able to execute control to open the purge pipe opening/closing means after closing the suction port opening/closing means.

15. A liquefied gas fuel supply device for a diesel engine according to claim 11, characterized in that the liquefied gas fuel retrieving control section is constructed to be able to execute, after the stop of a diesel engine, control to close the feed pipe opening/closing means and cut off supply of liquefied gas fuel to the fuel gallery, and execute, after stopping the feed pump with the suction port opening/closing means closed, control to open the purge pipe opening/closing means and suck the liquefied gas fuel remaining in the fuel gallery and the overflow fuel pipe to the low-pressure tank.

16. A liquefied gas fuel supply device for a diesel engine according to claim 3, characterized in that the remaining fuel retrieving means includes feed pipe opening/closing means for opening and closing communication of the feed pipe on the same side as the injection pump with respect to the branch point between the feed pipe and the fuel circulation pipe; fuel circulation pipe opening/closing-means for opening and closing an inlet of the aspirator; suction port opening/closing means for opening and closing a communication pipe between the suction port of the aspirator and the fuel gallery as well as the overflow fuel pipe; and a liquefied gas fuel retrieving control section for executing control to open and close the feed pump, the feed pipe opening/closing means, the fuel circulation pipe opening/closing means, and the suction port opening/closing means, the liquefied gas fuel retrieving control section being constructed to be able to execute, after the stop of a diesel engine, control to close the feed pipe opening/closing means and cut off supply of liquefied gas fuel to the fuel gallery, and control to circulate the liquefied gas fuel delivered from the feed pump to the fuel tank via the fuel circulation pipe while causing the suction port of the aspirator to communicate with the fuel gallery as well as the overflow fuel pipe, by executing control to open the fuel circulation pipe opening/closing means and the suction port opening/closing means.

17. A liquefied gas fuel supply device for a diesel engine according to claim 16, characterized in that the liquefied gas fuel retrieving control section is constructed to be able to execute control to hold the liquefied gas fuel in the state of being charged in the feed pipe between the feed pipe opening/closing means and the check valve, while continuing control to close the feed pipe opening/closing means, after having retrieving to the fuel tank the liquefied gas fuel remaining in the fuel gallery and the overflow fuel pipe.

18. A liquefied gas fuel supply device for a diesel engine according to claim 16, characterized in that in the remaining fuel retrieving means, the aspirator and the fuel circulation pipe opening/closing means are disposed immediately close to the fuel tank.

19. A liquefied gas fuel supply device for a diesel engine according to claim 16, characterized in that in the remaining fuel retrieving means, the feed pipe opening/closing means is disposed in the feed pipe in the vicinity of an inlet of the fuel gallery, and the check valve is disposed immediately close to the branch point between the feed pipe and the fuel circulation pipe.

20. A liquefied gas fuel supply device for a diesel engine according to claim 16, characterized in that the liquefied gas fuel retrieving control section is constructed to be able to execute control to open the vapor-phase pressure delivery pipe opening/closing means and deliver vapor-phase pressure in the fuel tank to the fuel gallery and the overflow fuel pipe.

* * * * *